United States Patent [19]

Bittar

[11] Patent Number: 5,480,005
[45] Date of Patent: Jan. 2, 1996

[54] ELEVATOR SWING CAR ASSIGNMENT TO PLURAL GROUPS

[75] Inventor: Joseph Bittar, Avon, Conn.

[73] Assignee: Otis Elevator Company, Farmington, Conn.

[21] Appl. No.: 179,459

[22] Filed: Jan. 10, 1994

Related U.S. Application Data

[63] Continuation-in-part of Ser. No. 887,946, May 26, 1992, Pat. No. 5,300,739.

[51] Int. Cl.⁶ .................. B66B 1/20; B66B 1/18
[52] U.S. Cl. .......................... 187/383; 187/385
[58] Field of Search .................. 187/380, 383, 187/384, 385, 387

[56] References Cited

U.S. PATENT DOCUMENTS

| | | | |
|---|---|---|---|
| 4,298,100 | 11/1981 | Süss et al. | 187/29 R |
| 4,349,087 | 9/1982 | Bittar et al. | 187/382 |
| 4,363,381 | 12/1984 | Bittar | 187/387 |
| 4,792,019 | 12/1988 | Bittar et al. | 187/385 |
| 4,815,568 | 3/1989 | Bittar | 187/387 |
| 4,838,384 | 6/1989 | Thangavelu | 187/385 |
| 5,022,497 | 6/1991 | Thangavelu | 187/382 |
| 5,024,295 | 6/1991 | Thangavelu | 187/382 |
| 5,092,430 | 3/1992 | Goto et al. | 187/122 |
| 5,260,526 | 11/1993 | Sirag | 187/387 |
| 5,300,739 | 4/1994 | Bittar | 187/385 |

FOREIGN PATENT DOCUMENTS

| | | | |
|---|---|---|---|
| 1231793 | 12/1989 | Japan . | |
| 4-80185 | 3/1992 | Japan | 187/112 |

*Primary Examiner*—Peter S. Wong
*Assistant Examiner*—Robert Nappi

[57] ABSTRACT

An elevator system has a low rise group of floors and a high rise group of floors and a swing car having doors and car call buttons enabling it to operate in either the low rise or high rise, the swing car being assignable to one or the other rise depending upon the burden, but also being able to accept calls in the other rise in response to a variety of characteristics of traffic within the elevator system. In one embodiment, the swing car is always assigned at the lobby to the low rise but proceeds into the high rise in response to hall calls therein; the swing car can accept down calls in the low rise if there is a high burden in the low rise or a down call has been waiting for a long time, or if the car has a very light load. Dedicated cars may be shut down and only the swing cars used at nights and on weekends. At nights and on weekends, the high rise and low rise can be effectively merged into a single system served by swing cars, thereby to save energy in light traffic.

62 Claims, 11 Drawing Sheets

| FIG. 4a | FIG. 4b |
| --- | --- |
| FIG. 4c | FIG. 4d |

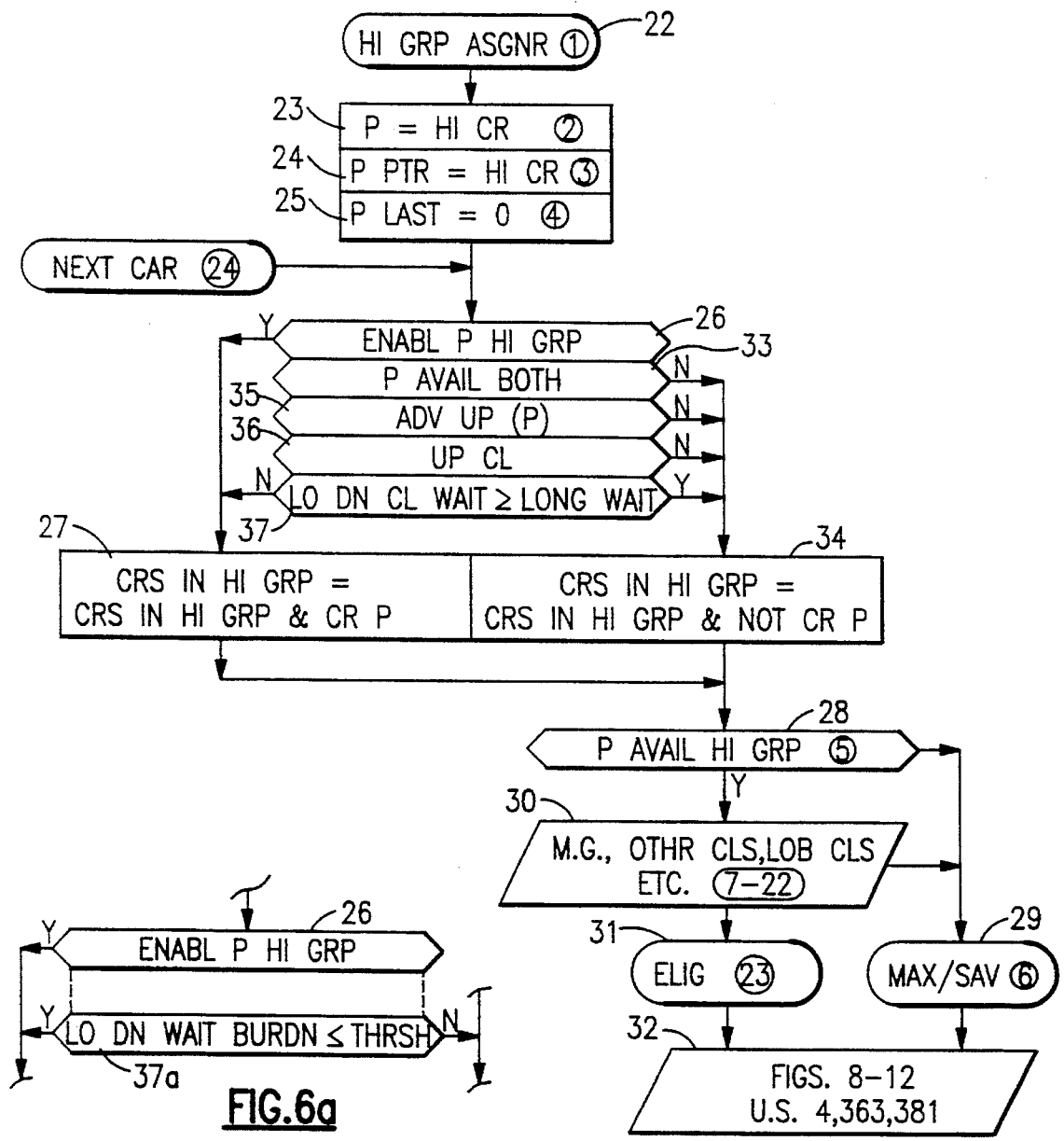
FIG.6
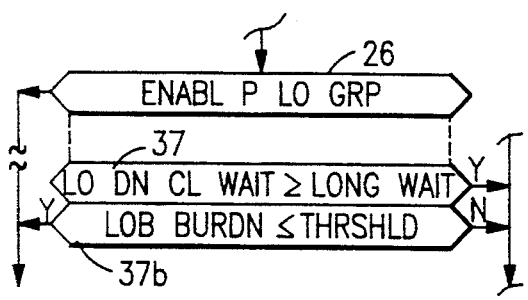
FIG.6a
FIG.6b

ELEVATOR SWING CAR ASSIGNMENT TO PLURAL GROUPS

This application is a continuation-in-part of parent application U.S. Ser. No. 07/887,946 filed May 26, 1992 U.S. Pat. No. 5,300,739.

TECHNICAL FIELD

This invention relates to operating elevator swing cars in more than one elevator dispatching group at a time.

BACKGROUND ART

There is a half century of history of schemes which have been implemented for improving the efficiency of elevators. Among these are ways of determining which car shall answer a hall call, such as the relative system response dispatchers disclosed in U.S. Pat. Nos. 4,363,381, 4,815,568, to Bittar, and 5,024,295. Others involve peak period dispatching, including zoning and channeling, some of which is disclosed in U.S. Pat. Nos. 4,792,019 and 4,838,384. And, to improve further on such systems, various forms of traffic prediction estimates have been used, such as in U.S. Pat. No. 5,022,497. The systems become more sophisticated with techniques which have been variously referred to as artificial intelligence, fuzzy logic and so forth. All of the foregoing relate to efficient operation of the elevators within a group.

To achieve more efficient operation of tall buildings (in excess of, say, 20 floors) buildings have been provided with groups of elevators, one group operable only in the lowermost floors, and the other group operable only in the highest floors of the building, in which case the groups are referred to as the "low rise" and the "high rise". In the aforementioned parent application, swing cars that can serve a low rise and a high rise (or low and medium, medium and high) are selectively assigned to the group controller related to that rise (low or high) having the highest traffic burden, on an every cycle basis with the possibility, and real likelihood, of assigning each swing car to a different group each time that it completes a trip. That system takes advantage of the precept that regardless of the floors at which persons enter an elevator, they are not concerned with which lobby service corridor they are delivered to, and therefore can be delivered to the lobby service corridor of a group other than the group under the control of which the passengers entered the car at floors above the lobby. In that system, elevator cars which are located within the lobby service corridor dedicated solely to one group (e.g., low rise) are also located in the lobby service corridor dedicated solely to a second group (e.g., high rise). Such an elevator swing car has doors on two sides operable to allow passage of passengers between the car and either one of two such distinct lobby service corridors which are opened to the lobby service corridor associated with the set of floors to which it has been assigned for its next run as it approaches the lobby floor at the conclusion of a current run, without regard to the set of floors to which it had been assigned during the current run. In normal operation, each swing car is assigned to a group controller related to one set of floors each time that the swing car concludes a run and approaches the lobby floor. In any cycle when an elevator is being assigned, it can be assigned to one of the groups and help that group out. Within minutes, either itself or a companion swing car can be assigned to the other group to help that group out. Within minutes it can be reassigned to the second group or it can be assigned back to the first group, the point being that no fancy determination has to be made because the determination can be reversed on a cyclic, per-run basis. Once an elevator is assigned to a group, it simply is added into the logic for that group and can be handled in the same fashion as any other elevator in that group.

In the system of the parent application, the assignment to one elevator rise group or the other (which herein are taken to be a low rise and a high rise) is made only as it approaches the lobby floor at the completion of each run. If a car exhausts its demand (having no hall calls or car calls) it must return to the lobby only to determine whether it should be assigned to the high rise or the low rise, regardless of how heavy the traffic level may be, and regardless of whether the greatest demand is at the lobby or on the upper floors. This is wasteful in other than up peak periods. Similarly, that system does not permit a car assigned to the low rise to keep traveling upward and respond to hall calls in the high rise. Whenever a car in the high rise is returned to the lobby with an extremely light load (such as late in the evening, in an office building) it loses the opportunity to pick up one or two passengers on the way down. Of course, there is no point to having a high rise and a low rise if every elevator serves both rises; this is simply a reversion to the ancient single rise system which would be totally disastrous in very tall buildings.

DISCLOSURE OF INVENTION

Objects of the invention include improved utilization in an elevator system having high rise floors and low rise floors served by different elevator groups and having at least one swing car which may be utilized in either the low rise group or the high rise group; permitting reassignment of a swing car in such a system to one or the other of the groups without necessarily requiring an approach to the lobby floor; promoting efficient use of cars in both rises; saving elevator response and elevator service time; and saving energy in a swing car elevator system.

The invention is predicated, in part, on the notion that although express runs are required (from a lobby to the lowest of the high rise floors and from the lowest of the high rise floors to the lobby) to provide adequate service to passengers in the upper floors of tall buildings, there is little reason to not permit a swing car that is servicing calls in an up direction within a low rise to thereafter service calls in the up direction within a high rise and end up servicing any calls in a high rise in a normal fashion. The invention is further predicated on a similar concept that the express run between the lowest floor of a high rise and the lobby may nonetheless accommodate one or two hall call stops in the low rise during periods of extremely light traffic, particularly at night and during weekends. Another predication of the invention is that when the car has no demand whatsoever, it can readily be reassigned to service where it will do the most good by allowing it to serve demand in either the high rise or the low rise, without first returning to the lobby.

According to the present invention, a swing car having two sets of doors, one of which provides access to low rise corridors and the other of which provides access to high rise corridors, is allowed to simultaneously be assigned in both the low rise group and the high rise group, whenever an additional group needs help. According further to the invention, a swing car assigned to one group may assist another group when the car has a very light load. According still further to the invention, energy is saved in an elevator system having a swing car which can serve both the low rise and the high rise by allowing the swing car, when operating within one of the rises, to accept hall calls in another of the rises whenever it can do so without unduly disrupting the flow of traffic in the system. In further accord with the invention, the contemporaneous assignment in both groups is qualified by low competing traffic burden. In still further accord with the invention, the lobby burden and the non-lobby burden in both the high rise and the low rise are monitored separately.

In accordance with the invention, a swing car is enabled to service hall calls in either rise, directly, whenever it has no demand (no hall calls or car calls to service).

In accordance further with the invention, the swing car assigned to a first group may also be assigned hall calls in the other group whenever the assignment of such calls will not result in an undue hall call delay in the first group.

According to a preferred embodiment of the invention, each time that a swing car approaches the lobby floor, its hall lantern for the low rise lobby service corridor is operated, and the swing car is enabled for operation in both the low rise and the high rise, and enabled to respond to hall calls assigned thereto in both the low rise and the high rise. In this embodiment, when the car is traveling downward in the high rise, it can respond to hall calls in the low rise if there is a down hall call in the low rise which has been waiting for a long time period, or if there is a high burden in the low rise, or if there is an extremely light load in the swing car.

In accordance with one selected embodiment of the invention, a car traveling upwardly in a lower rise is allowed to be assigned hall calls by the group which controls the rise above it unless the lower rise has at least one down hall call that has been waiting excessively long, in which case the upwardly traveling elevator is limited to receiving hall calls within the rise in which it is presently traveling. In a selected embodiment of the invention, a car traveling downwardly in an upper rise is not allowed to be assigned hall calls in the rise below it unless the rise below it has at least one down hall call which has been waiting excessively long; otherwise, the downwardly traveling car will travel through the rise below it as an express zone. The invention may be characterized in these embodiments as allowing upwardly traveling swing cars to continue upwardly into the next rise, unless the lower rise needs help, and preventing downwardly traveling swing cars from taking calls in a lower rise unless that lower rise needs help, as determined by some characteristic of the level of traffic.

In accordance still further with the invention, a swing car may be assigned to a third group in addition to the high rise group and/or the low rise group.

The invention is described herein in terms of a low rise and a high rise, which are disclosed as being the only two rises in a two rise building. However, these terms are meant to imply any rise which is lower than another rise in which case the high rise might be related to the low rise as a medium rise in a three rise building, and the low rise might be related to the high rise as a medium rise in a three rise building. Although disclosed as relating to contiguous rises, the precepts of the invention are equally viable as between any pair of rises, one above the other, even though there may be other rises intervening. In fact, the invention may assign medium and high rise calls to a car traveling upwardly in the low rise, simply by keeping track of all of the hall calls assigned to an elevator, regardless of the group which assigns it. The invention encompasses allowing a car to be in three dispatching groups (or even more) at one time.

In accord with the invention, when traffic is very light, such as late at night and on weekends, the swing cars of a building can handle all of the traffic, one or more, or all of the dedicated, single rise cars being shut down. In accord further with the invention, two groups handling two rises of a building, in which swing cars assume all of the traffic burden during periods of light traffic, may be merged into a single group, essentially, through the mechanism of making each of the operating swing cars fully available in both groups.

By allowing (when appropriate) the swing car to be assigned to hall calls in the high rise, as the elevator car proceeds upwardly servicing hall calls and car calls in the low rise, the swing car may transfer from low rise to high rise service, thereby freeing yet another car for service to the low rise followed by service to the high rise, which helps satisfy high rise interfloor traffic and traffic from the high rise to the lobby without requiring that cars return to the lobby before being assigned to the high rise. Allowing the high rise car to pick up passengers in the low rise on its way to the lobby, during periods of light traffic, avoids the waste of a downward express run.

The exemplary embodiments herein are illustrative of controls which can utilize the precepts of the invention in order to improve swing car operation within a lower rise and a higher rise.

The present invention is implementable using nothing but apparatus and software techniques which are well known in the art, in the light of the teachings hereinafter.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 6 is a logic flow diagram of an exemplary routine for assigning hall calls in the high group to cars, including swing cars which may be available to the high group, in a first embodiment.

FIG. 6a is a first modification of FIG. 6 illustrating a different traffic level characteristic.

FIG. 6b is a modification of FIG. 6 illustrating use of a combination of traffic level characteristics.

BEST MODE FOR CARRYING OUT THE INVENTION

Figure 1:
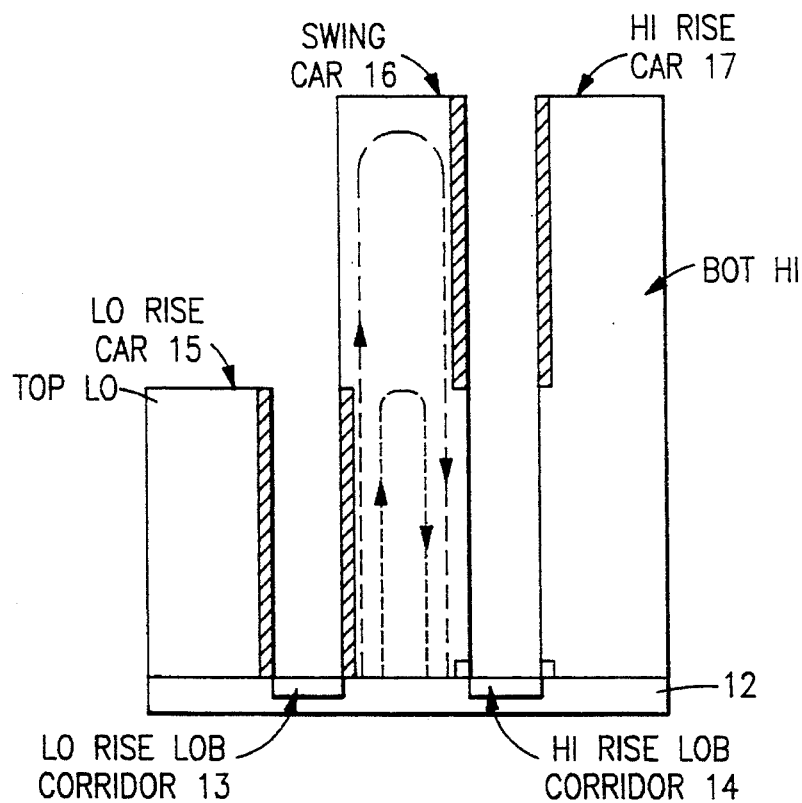
FIG. 1 is a simplified, stylized sectioned side view of an elevator system employing the present invention.

Referring now to FIG. 1, the lobby floor of a building having an elevator system incorporating an embodiment of the present invention has a general lobby area 12 which feeds into two corridors 13, 14 designated as low rise (LO) and high rise (HI). As illustrated, the low rise lobby corridor 13 will serve a designated low rise car 15 and the low rise portion of a swing car 16 (as shown by the dotted arrow in FIG. 1). The high rise lobby corridor 14 will serve a dedicated high rise car 17 and the high rise service of the swing car 16 (as shown by the dashed arrow in FIG. 1). In fact, a typical installation will more likely have two through six low rise cars, and a similar number of swing cars and high rise cars. The system of the aforementioned parent assigns the swing car 16 to serve either the low rise or the high rise; thereafter, when it completes service in the assigned rise, the swing car 16 must return to the lobby to be assigned again either to the same or to the other rise; when the swing car 16 is serving the high rise floors, the low rise floors fall within its express zone (which is the case all of the time for the high rise car 17). In accordance with the invention, a car assigned to the low rise can proceed upwardly, delivering car call passengers and picking up hall call passengers in the low rise, but, prior even to reaching the top floor of the low rise (TOP LO), having up hall calls of the high rise assigned to it, if the assignment routine finds that to be appropriate. Then, when the swing car 16 reaches the TOP LO floor, it will no longer be available to the low rise group and become available to the high rise group so as to answer those calls and be assigned additional hall calls in the high rise, beginning with the bottom floor of the high rise (BOT HI). This would be self-leveling in the sense that each time that an elevator services the low rise it ends up servicing the high rise as well, making it more likely that the burden will be higher in the low rise, so another low rise car will be assigned except for the fact that this could cause down calls in the low rise to remain unanswered. As is described hereinafter, there is therefore a predilection against assigning up hall calls to an upwardly traveling swing car in the low rise whenever the burden of passengers waiting for down service in the low rise exceeds a threshold. Similarly, the concept of a high rise separate from a low rise precludes assigning any calls to a high rise car traveling upwardly through the low rise, since the objective is to cause the passengers to reach the high rise floors quickly. On the other hand, if traffic is exceedingly light, there is no reason why an elevator can't pick up a passenger on the way from the high rise to the lobby. All of this is described more fully hereinafter.

Another multi-group function which the present invention can perform is the assignment of hall calls from yet another group to an elevator which is basically assigned to the low rise group or the high rise group. In a commonly owned, co-pending U.S. patent application filed contemporaneously herewith, Ser. No. 08/179,169, filed Jan. 10, 1994, a swing car system of the type illustrated in FIG. 1 is modified by including an interrise group which allows passengers in the low rise to press hall call buttons in a special riser, perhaps requiring a key, key card or keypad entry, for travel into the high rise, and similarly traveling from the high rise to the low rise. In this invention, that is accommodated simply by defining interrise as a group and allowing inter group hall calls of the invention between the low rise group and the high rise group, and vice versa.

Figure 2:
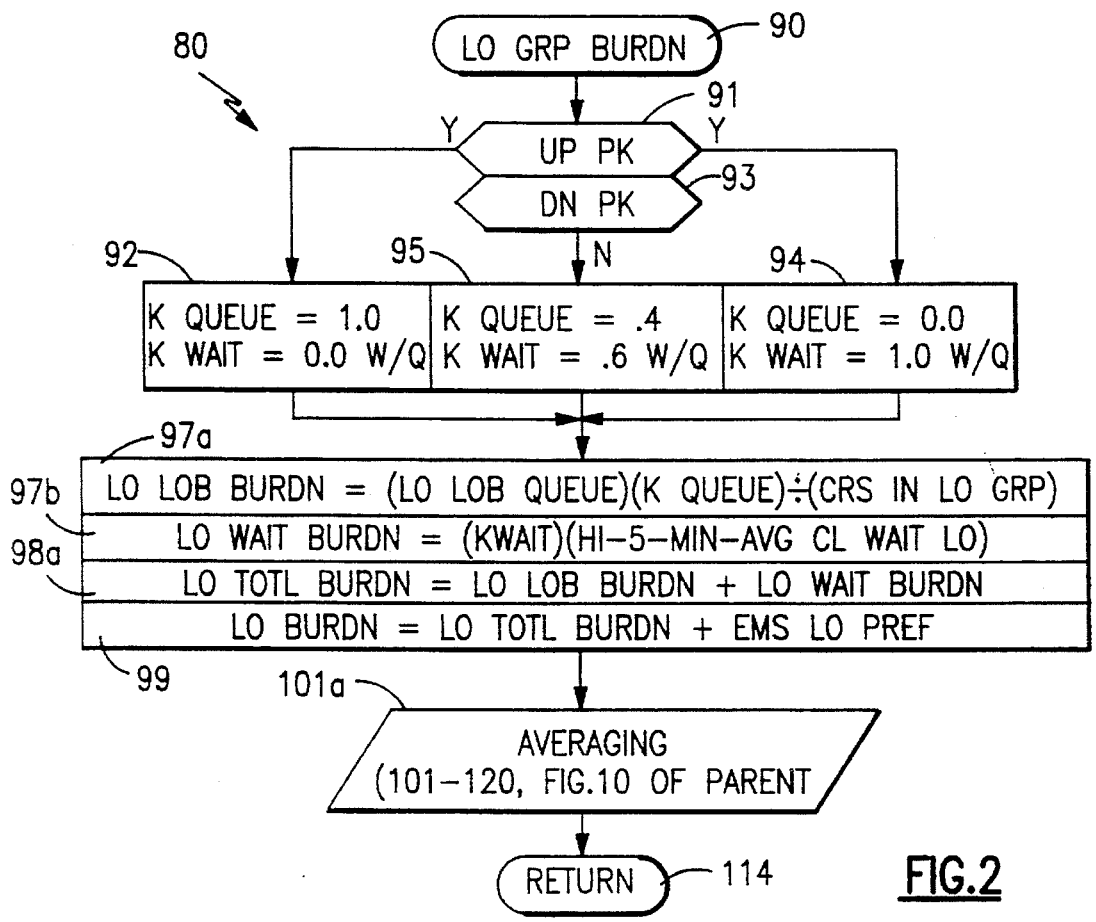
FIG. 2 is a logic flow diagram of an exemplary routine for determining the traffic burden in a low rise group which may be utilized in accordance with the present invention.
Figure 8:
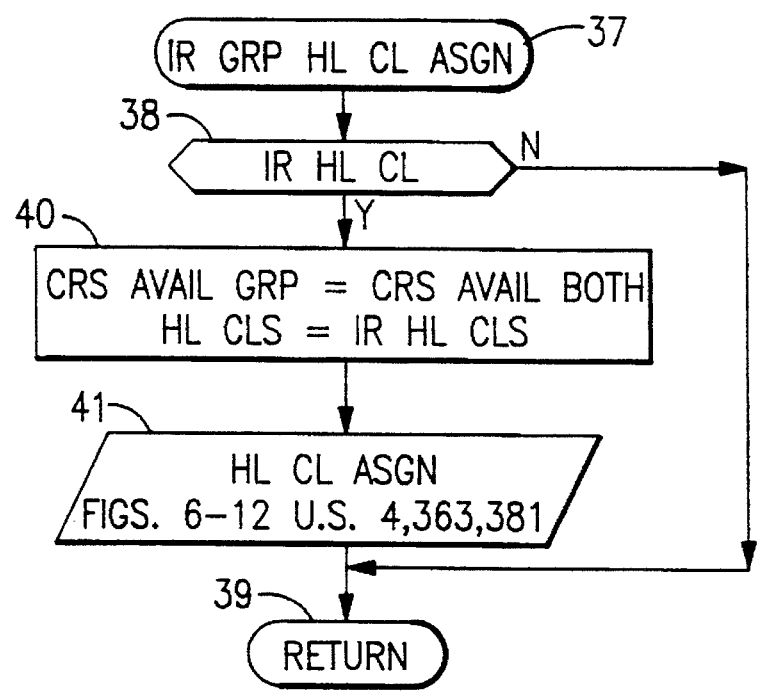
FIG. 8 is a logic flow diagram of an exemplary routine for assigning interrise hall calls to available swing cars.

Much of the disclosure herein is the same as and somewhat modified from the disclosure in the aforementioned parent, and FIGS. 1 and 8 herein are identical to FIGS. 1 and 2 of the contemporaneous application. To facilitate amplifying the disclosure that is contained herein, the same reference numerals are used herein as are used for identical things in the parent and in FIGS. 1 and 2 of the contemporaneous application; similar items bear the same numbers with letter suffixes to indicate the similarity to the parent but with modification.

Referring now to FIG. 2, the low group burden software module is reached through an entry point 90. A first step 91 determines if the elevator is in an up peak period; if so, an affirmative result reaches a pair of steps 92 wherein constants that weight the relative importance of lobby queue and passenger waiting time for calls are established. During up peak, the group having the largest number of passengers arriving at its lobby service corridor should be given preference over the other group, in one embodiment of the invention. Thus, one might favor assignments based on lobby queue by causing the constant for lobby queue burden to be 1.0 and the constant for passenger waiting to be 0.0. As described more fully hereinafter, to facilitate biasing on the basis of how many passengers a car can hold, the constant for the waiting time also has a factor "W/Q" which converts seconds or minutes of average hall call waiting time into an equivalent load factor expressed in terms of number of people standing in a queue in the lobby. This is a fictitious number but is undertaken so that all burden can be expressed in a common metric, chosen herein to be number of people. The constants could, however, be 0.8 and 0.2 as in the aforementioned parent, if swing cars are allowed to take hall calls during peak traffic.

If the low rise group is not operating in an up peak period, a negative result of test 91 will reach a test 93 to determine if the group is operating under down peak conditions. If so, an affirmative result will reach a pair of steps 94 where the queue constant and waiting constant are set to different values. While these values can be selected and altered regularly to suit the needs of any building traffic patterns, the ones chosen herein for example only are that the queue constant be set to zero and the waiting constant be set to one times the conversion factor "W/Q". This means that during down peak, lobby floor passengers will be not considered in the determination of assigning swing cars, but only the average waiting time in two different groups will be considered. On the other hand, other values could be chosen to suit any particular dispatching scheme or traffic pattern.

If neither up peak nor down peak are in process, negative results of both tests 91 and 93 will reach steps 95 where still different values will be established for the constants. In this example, it is assumed that waiting for elevators at the floors is paramount since during off-peak, the interfloor traffic can be heavy. Therefore, the queue constant is set to 0.4 while the wait constant is set to 0.6 W/Q; of course, other constants could be used here as well. Since the cars can be swung back and forth between groups so readily, it may not even be necessary to have any constants at all. To effect such a thing, all of the constants in the steps 92, 94, 95 could be set to one so that they will have no effect on establishing burden in the group. And if desired, the W/Q conversion constant can, in some cases, be set to one, as well. The constants in each of the steps 92, 94, 95 are shown by way of example as having a total value of one; this is not necessary; any reasonable constants can be used so long as each step 92, 94, 95 has the same constants as the comparable steps in the related (e.g., high) group burden subroutine.

The burden for the group is built of different components in several stages. Low burden is the factor which identifies the burden attributed to the low group which can be compared to the burden attributed to the high group in order for the building low/high software module (FIG. 11 of said parent) to pick which group should have the swing car assigned to it next, as a car approaches the lobby at the completion of a run. In the steps 97a, the low lobby burden factor is initially established as a value for the queue in the low rise lobby corridor 14 (which can be determined by people counters in a manner known to the art) times the queue constant, all of which can be divided by the number of cars in the low group. This division is made so as to relate the burden to the ability to handle the burden. In that way, if the low group were operating say with only two dedicated cars, while the high group had four dedicated cars, queues of equal amounts should be treated as if they are much greater burden to the low group than to the high group. But if the low group had two swing cars assigned to it, the ability to handle equal burden would be about equal. Dividing by the number of cars in the group is an equalizer. It also works out that, as described more fully hereinafter, as a car is approaching the lobby and may have just been assigned to a group, it immediately gets counted in this step 97 so as to indicate that help is on the way. This tends to cause equalization of burdens the instant the car is assigned to a group. In a step 97b, low wait burden is formed from the highest one of the average call waiting times for passengers in the low rise floors over the past five minutes, times the waiting constant. Of course some other period of time can be chosen or some other indicium of passenger waiting time can be chosen if desired. As described hereinbefore, by choosing the waiting constant to be zero, the time which passengers wait can be totally ignored, if desired in any use of the invention. In a step 98a, total low burden is formed as the sum of the lobby and wait burdens. In a step 99, low burden has added to it a preference (if any) established by the elevator management system (EMS); in a usual case, this preference may be zero. But it may be some value that would reflect the desire to have the performance in one of the rises better than performance in another; such a case may occur if visiting dignitaries were utilizing floors in the high rise and the building management desired to assure superb service thereto. It could also be used for quasi-enhancement, described with respect to FIG. 5, hereinafter. On the other hand, the preference can be negative and actually act as a penalty, if desired; this would have the effect of preferring the high rise over the low rise, such as to compensate for longer run times to the high rise.

The remainder of the routine of FIG. 2 is a subroutine 101a which only provides for averaging the calculated low burden over several calculations thereof, if desired. It is not necessary. It is assumed that if averaging is desired, then the elevator management system will establish a flag bit to permit averaging to be accomplished. If it does so, averaging is performed as set forth in steps and tests 101–120 of FIG. 10 of the parent. And then other parts of the program may be reverted to through a return point 114.

Instead of utilizing lobby queue and call waiting time as described hereinbefore, the choice of which traffic (high rise or low rise) a swing car should service in its following run might be based upon estimates derived from history and/or other predictions, with or without actual current data involvement, such as in the aforementioned '497 patent. Otherwise, any form of determining the nature of traffic comparison for choice of swing car next run assignment may be used to suit any utilization of the present invention.

Figure 3:
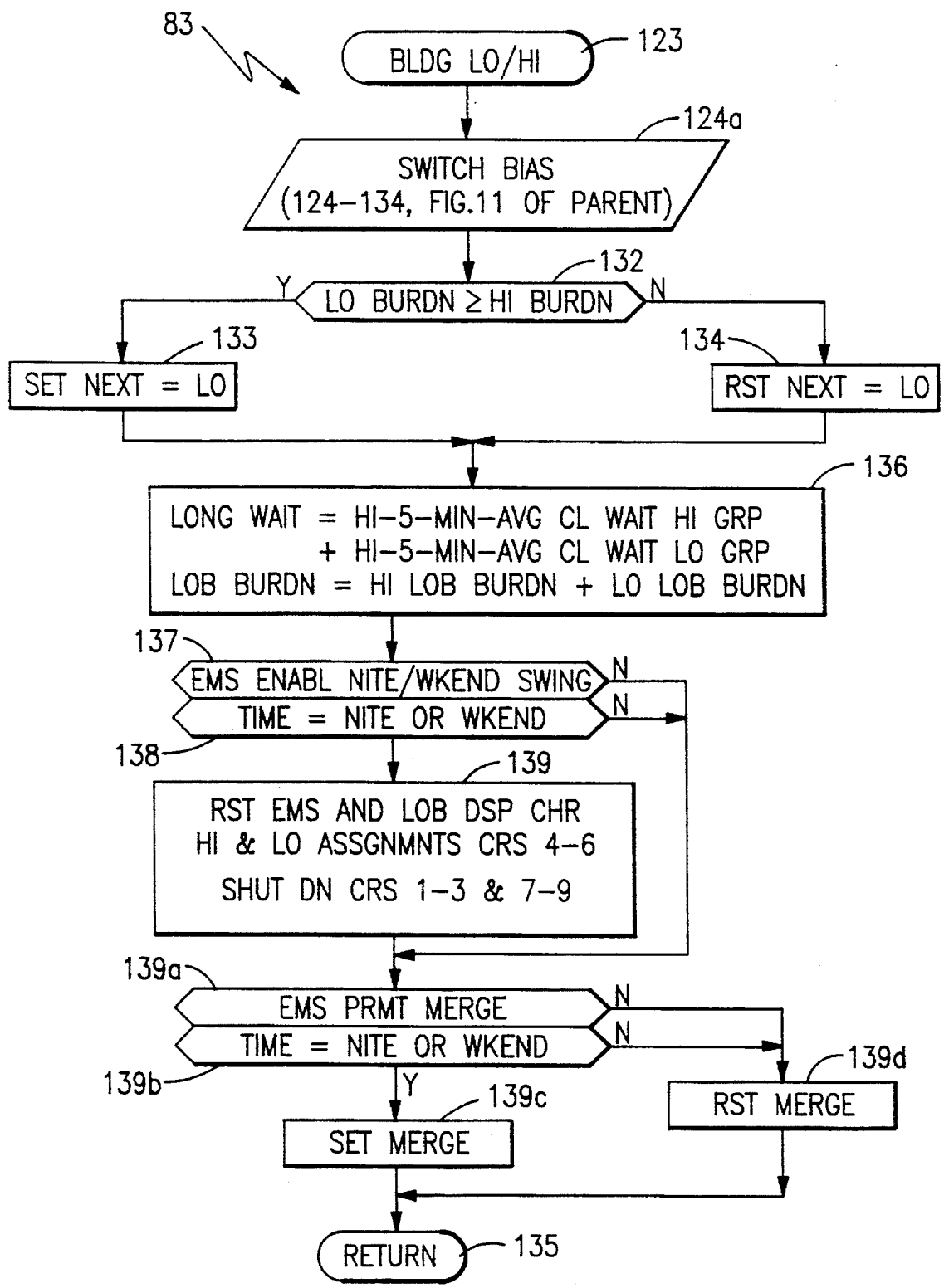
FIG. 3 is a logic flow diagram of an exemplary routine for determining the relative burden between the low and the high group, defining the length of a call determined to be a long wait, and for controlling night/weekend swing car operation.

The low burden values calculated as described with respect to FIG. 2, as well as high burden values calculated in the same way, are utilized for a building low/high software module of FIG. 3 to determine which rise should have the next swing car assigned to it. The process simply determines if low burden is equal to or greater than high burden, and if so, sets a flag (used in FIG. 4 herein) indicating that the low rise should be assigned the next available swing car; otherwise, the flag is not set. In the example shown in FIG. 11 of the parent, the ability to bias the burdens before making the determination is provided, as an option which is not necessary to the invention, as illustrated by the subroutine 124a in FIG. 3 herein. The actual determination takes place in a test 132 which simply determines if low burden is equal to or greater than high burden. If it is, an affirmative result of test 132 sets a "next equal low" flag in a step 133; if low burden is not equal to or greater than high burden, then a negative result of test 132 reaches a step 134 which resets the "next equal low" flag, thereby causing the next car to be assigned to the high rise. Thus the building determination of low or high for the next assignment of a swing car is simply comparing burdens and either setting or resetting the "next equal low" flag.

Figures 7, 7A, 7B:
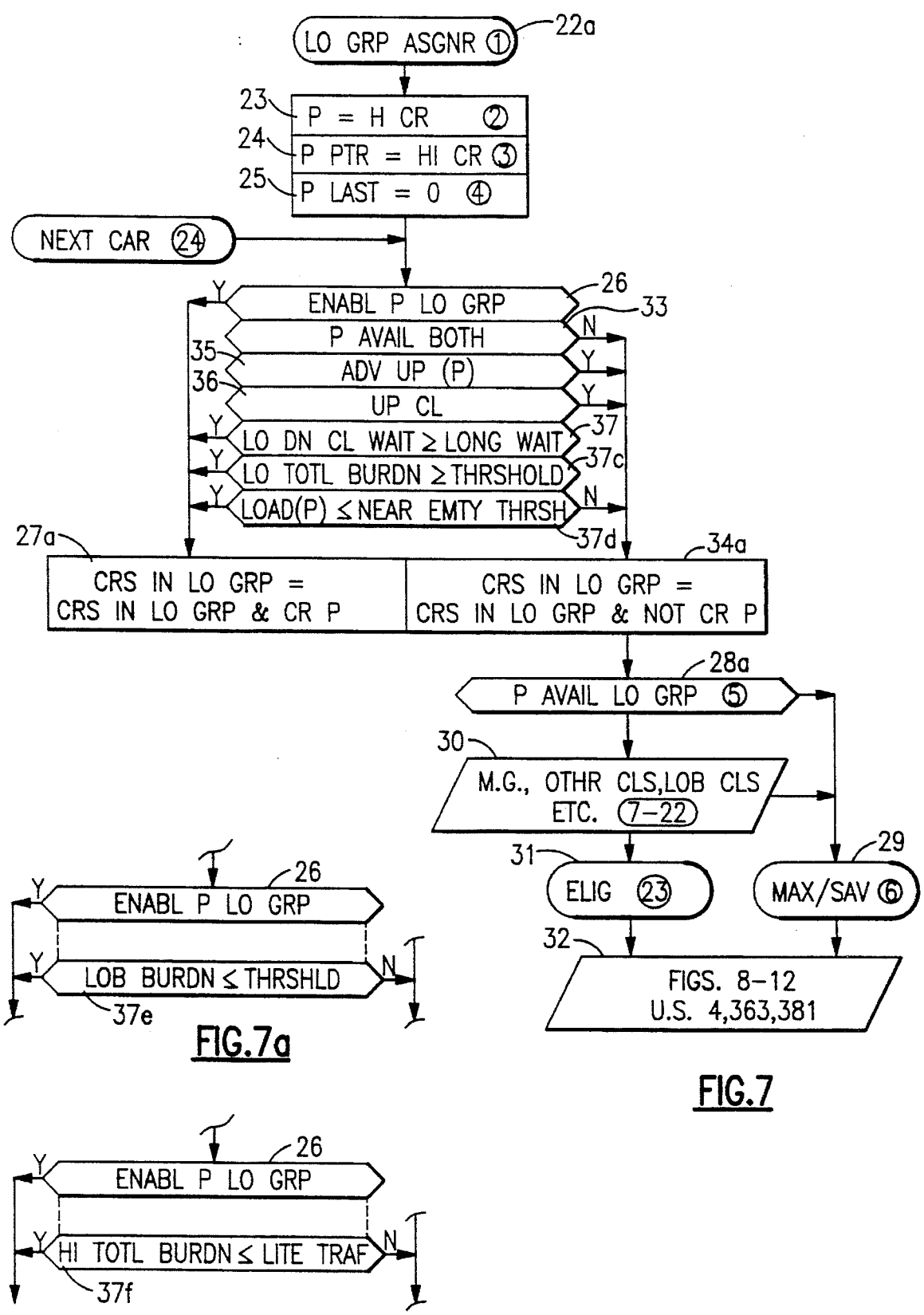
FIG. 7 is a logic flow diagram of an exemplary routine for assigning hall calls in the low group to cars, including swing cars which may be available to the low group.
FIG. 7a is a modification of FIG. 7 illustrating yet another traffic level characteristic.
FIG. 7b is a modification of FIG. 7 illustrating still another traffic level characteristic.

Then the value of what is to be considered to be a "long wait" threshold, for determining whether or not dual group assignments should be permitted, as in FIGS. 6 and 7, is calculated in steps 136 as the sum of the high five minute average call wait time in the high group summed with the high five minute average call wait time in the low group; this sum is equal to twice the average of the total. And a lobby burden factor is generated in steps 136 as the sum of high lobby burden and low lobby burden. Then, a test 137 determines if the elevator management system has enabled night and weekend swing car operation, or not. If not, a negative result of test 137 reaches a test 139a, described hereinafter. However, if night and weekend swing car operation is enabled, an affirmative result of test 137 reaches a test 138 to determine if it is currently considered to be nighttime or during the weekend (the weekend may begin, say, at 9:30 on Saturday morning). If not, the return point 135 is reached. But if so, an affirmative result of test 138 reaches a series of steps 139 in which all of the elevator management system and lobby dispatcher permanent assignments of all the swing cars (cars four, five and six in the FIG. 7 embodiment of the aforementioned parent application) to either the high or the low group are reset. These are the assignments which are tested in tests 144–147, in FIG. 4, hereinafter. And, all of the single rise cars, which would comprise cars 1–3 and 7–9 in the embodiment of FIG. 7 of the aforementioned parent application, are shut down. This is a feature of the present invention which saves a great deal of power during extremely low traffic periods, by allowing both the high rise and the low rise to be serviced only by the swing cars, utilizing the multi-group criteria which are described hereinafter.

In one embodiment, the swing cars treat the rises as being separate, even on the weekends and at night, while in another embodiment, the swing cars treat both rises as if they are merged into a single group during periods of light traffic, such as at night and during the weekend. If this is so, a test 139*a* will indicate that the elevator management system has been set to permit merging the two rises, and an affirmative result of test 139*a* will reach a test 139*b* to see if it is now nighttime or on a weekend, and if so a step 139*c* sets a merge flag indicative thereof. And then, other parts of the program are reverted to through a return point 135. On the other hand, if merging the two rises on the weekend is not desired, the elevators can still operate as available to both groups in a manner described elsewhere herein, without merging into a single system. In such a case, a negative result of test 139*a* will reach the step 139*d* to reset the merge flag. The merge flag is not also reset in step 139*d* in response to a negative result of test 137 (whenever the EMS has not enabled night or weekend swing car exclusivity) another mode in which the system can operate on the weekends is to allow certain of the single rise cars to be operating, and to allow the swing cars to operate in two rises, or in a building of more than two rises, in all the rises, if desired, as a single dispatching group. This provides extremely efficient operation in terms of allowing the swing cars to provide the service which the dispatcher determines to be effective for them to provide, while nonetheless having the single rise elevators standing by (possibly parked most of the time, if most calls can be best served by the elevator circulating in the entire building, or in multiple rises thereof). On the other hand, the EMS may not use a time test 139*b*; instead, it may use any sort of prediction or fuzzy logic to determine if the traffic characteristic is light enough to merit merging groups.

Figure 4A:
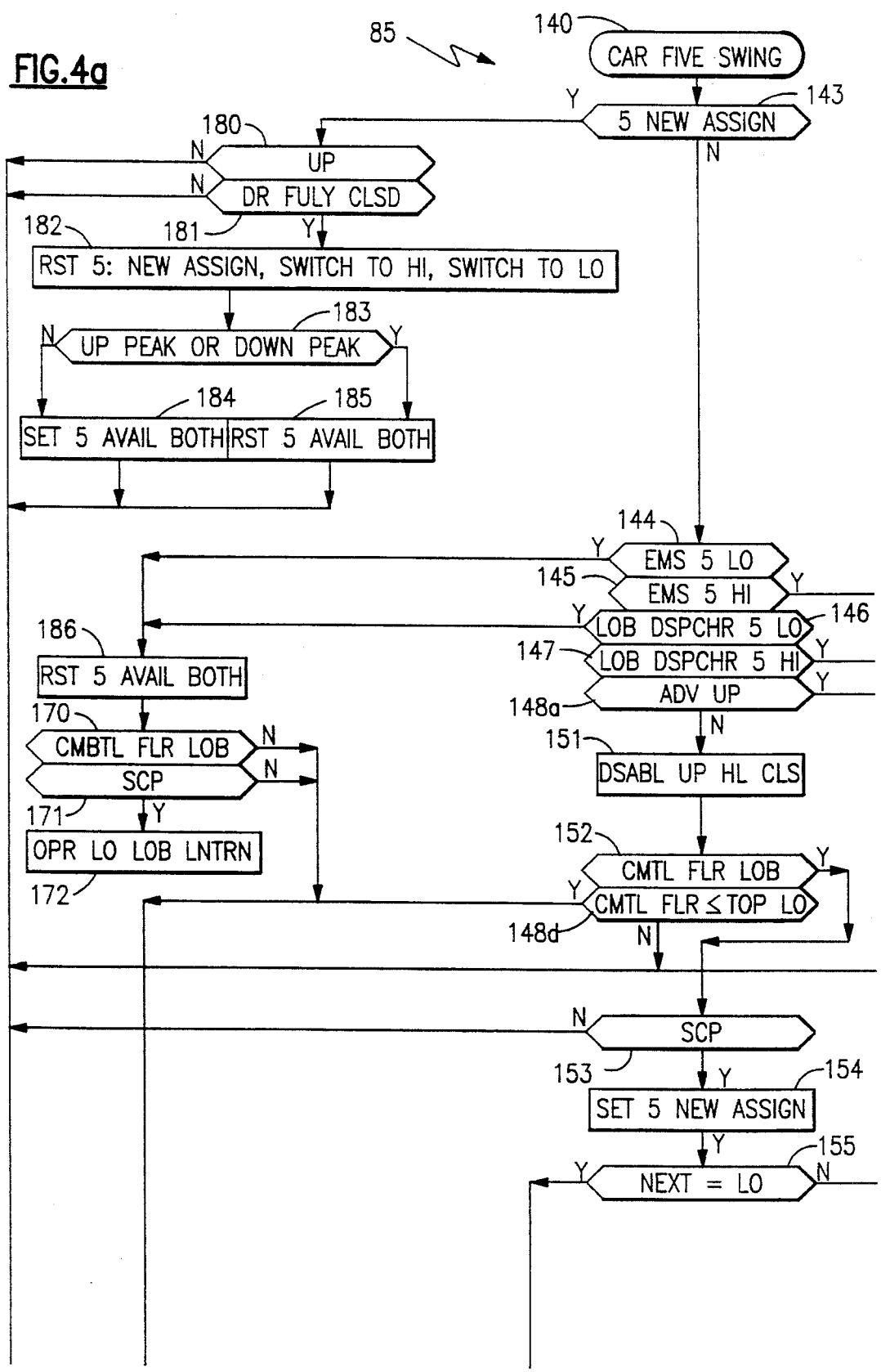
FIGS. 4 4a, 4b, 4c, 4d and 5 is a logic flow diagram of an exemplary routine for performing the functions necessary to operate car five in either the low group or the medium group, or both.
Figure 4B:
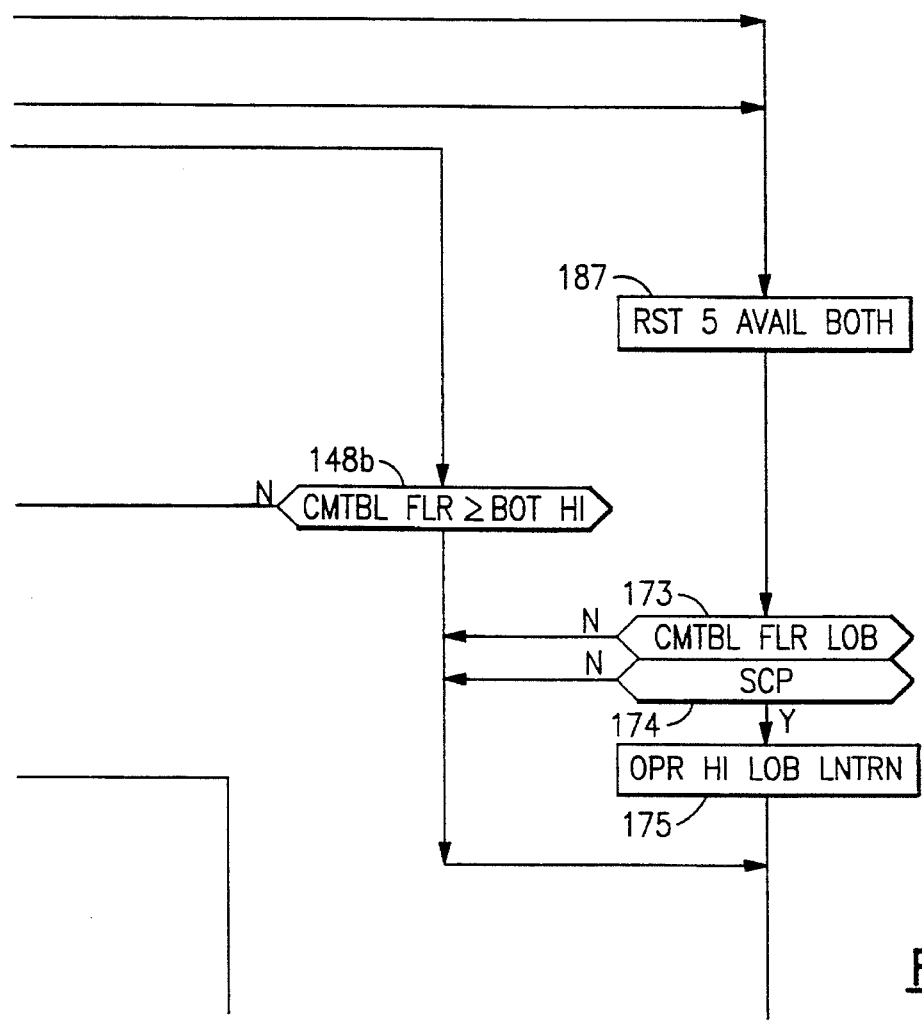
Figure 4C:
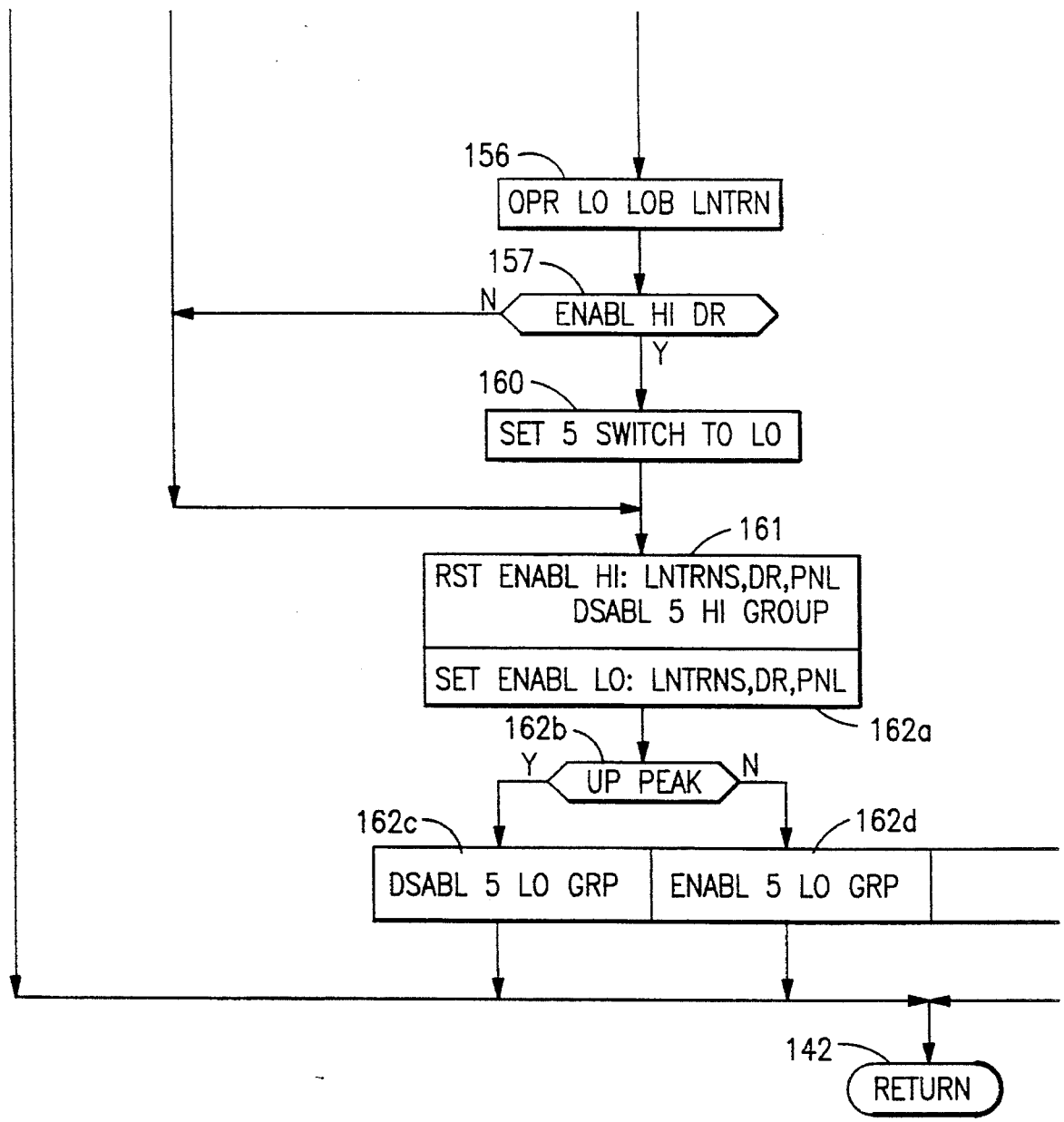
Figures 4, 4D:
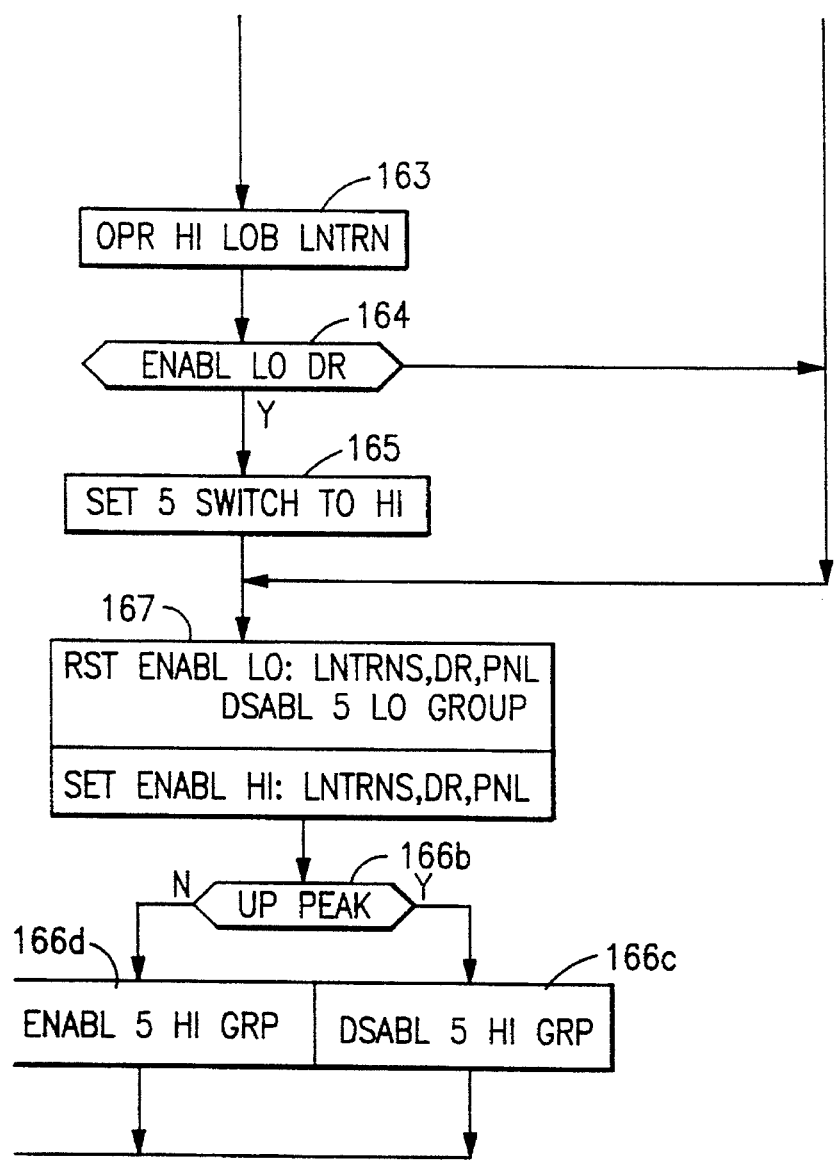
Figure 5:
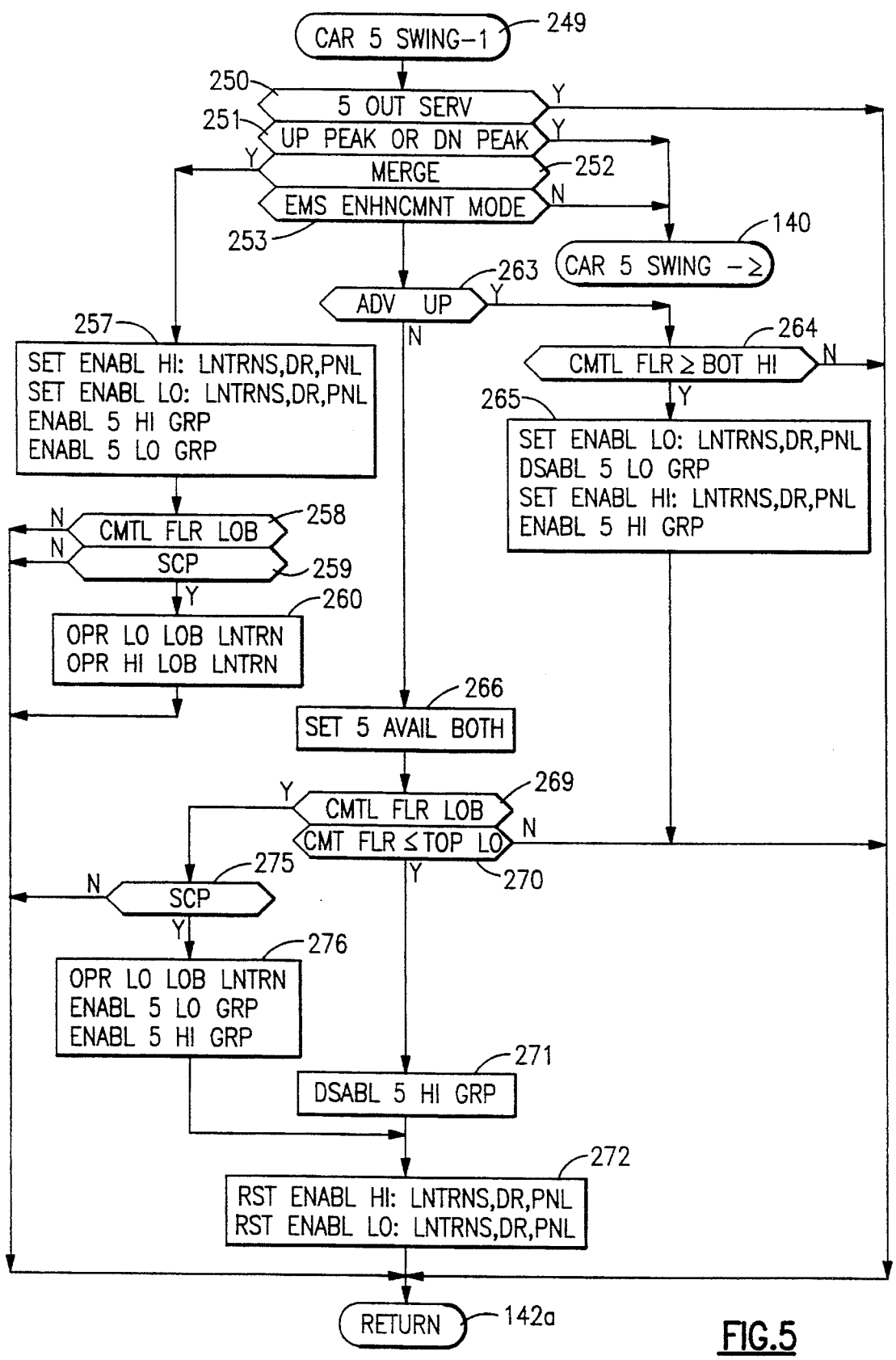

The "next equal low" flag (whether set or reset) is utilized in software modules for all swing cars (such as cars four, five and six in the FIG. 7 version of FIG. 1 of the parent) both of which can be assigned to either the low group or the high group; the software module is described for car five with respect to FIGS. 4 and 5. The principal function is simply to determine which hall lanterns to operate and enable, which car panel to enable (to allow car calls), which doors to enable, and to which group the car should be assigned.

The assignment of a car to service one rise or the other, under control of one or both groups is handled by a car five swing routine illustrated in FIGS. 4 and 5. The routine is entered, in FIG. 5, through an entry point 249. A first test 250 determines if car five is out of service, or not. If it is, other programming is reverted to through a return point 142*a*, without performing any of the swing car assignment functions. In the usual case, car five will be in service and a negative result of test 250 will reach a test 251 to determine whether or not an up peak or a down peak mode of operation is in effect. If either peak mode of operation is in effect, then the swing car will be assigned to either the high rise or the low rise that has the greatest burden at the lobby, as is described partially with respect to FIG. 3 and partially with respect to FIG. 4, hereinafter. In such a case, an affirmative result of the test 251 will reach a transfer point 140 which transfers the program to the routine of FIG. 4. If the elevator car is not operating in a peak period mode, a negative result of test 251 will reach a test 252 to determine if a night or weekend merge mode of operation is in effect. If not, then a test 253 will determine whether the EMS has put an enhancement mode in effect, or not. If the system is not in the merge mode or in the enhancement mode, then the transfer point 140 will also be reached.

In FIG. 4, the car five swing software module is reached through an entry point 140 and a first test 143 determines if car five has a new assignment. In this embodiment, new assignment means it has been assigned at the conclusion of a run, in response to the "next equal low" flag (or its absence). When the doors close for the car to leave the lobby, the status of new assignment ends. This simply prevents any change in assignment after the lantern has been operated, thereby drawing the passengers of the assigned rise toward the elevator. Thereafter, as will be described hereinafter, there is no possibility of reassigning the elevator until it again reaches the stop control point of the floor lobby when traveling in the down direction; or at other times in accordance with the invention. In any event, the usual case (in many computer cycles each second) is not a new assignment, so a negative result of test 143 will reach a plurality of tests 144–147 to see if either the elevator management system or a lobby dispatcher has assigned car five relatively permanently to either the low rise group or the high rise group, in a manner described more fully hereinafter. In the usual case of swing car operation, all of the tests 144–147 will be negative reaching another series of tests (which have no counterpart in the parent, and are designated with letter suffixes of the previously unused reference numeral 148). A test 148*a* determines if car five is advancing up. As used herein, "advancing up" means having a general progress direction, rather than actual motion direction or command, which in turn is referred to as simply "up". This allows performing dispatching tasks taking into account the general direction of the elevator, even though the elevator may be stopped with its doors open to permit exchange of passengers. If the elevator is advancing up, an affirmative result of test 148*a* will reach a test 148*b* to see if the upwardly traveling swing car has the bottom or higher floor of the high rise as its committable floor, or not. If it does, this means that the car has been assigned a hall call or has validly registered a car call in the high rise. This means that the car must be assured of being able to function in the high rise, and be able to conclude its tasks in a manner that allows it to be reassigned, as well. Therefore, an affirmative result of test 148*b* will reach steps 166*a–d* and 167, described hereinafter, to ensure that the car is operating as a high rise car, and not as a low rise car. This path through tests 148*a* and 148*b* may be performed many, many times (several times each second) as a car proceeds upwardly through the low rise and as it proceeds upwardly through the high rise. Therefore, the car may typically already be a high rise car, in which case performing the steps 166*a–d* and 167 is redundant, but harmless.

If the result of test 148*a* is negative, this means that car five is advancing downwardly. In such a case, it is usually desired to not permit the low group controller or the high group controller to cause a reversal in direction by assigning up car calls to a downwardly traveling elevator. This will ensure that the swing car will return to the lobby for normal assignments in the usual case. Therefore, all up hall calls in car five for the low group and high group are disabled. The disabling of calls may be achieved in FIGS. 5 and 6 herein, as in the relative system response method of assigning hall calls set forth in either of the aforementioned Bittar patents, simply by providing a disabling high penalty to any up hall call assignment for car five after the flag of step 151 is set. On the other hand, if an interrise call is being assigned by the interrise group, as described hereinafter with respect to FIG. 8, such disabling is not utilized; in other words, if a car is assigned to an up hall call by the interrise group, that call will not be blocked by the flag 151. Or if merging of the low rise and high rise has occurred, to handle light nighttime or weekend traffic, then up calls may be assigned to downwardly traveling elevators, as is the normal case for single rise elevators, as is described with respect to FIG. 5 hereinafter. While the car is advancing upwardly, there is always a positive result of test 148a, so step 151 is bypassed.

A test 152 determines if the elevator has reached the point in its travel that the next committable floor is the lobby floor. In the case of car five, when it is operating in the low rise, this would be somewhere near floor number 2; but when car five is operating in the high rise, the lobby becomes the committable floor as the elevator reaches the express zone (somewhere around the bottom floor of the high rise). During most of the passes through the car five swing routine of FIG. 4, the elevator will be at other points in the elevator shaft and a negative result of test 152 will lead to a test 148c which determines if the car has a committable floor in the low rise, other than the lobby floor. In this embodiment, it is assumed that a car which is traveling in the express zone (that is, advancing as an express car directly through the low rise) has a committable floor of the lobby, and having the committable floor of the lobby will cause an affirmative result of test 152 and therefore cannot cause an affirmative result of test 148d. If the car has a committable floor in the low rise other than the lobby, an affirmative result of test 148d will cause the program to advance to steps 161 and 162 to ensure that the car is operating as a low rise car and not as a high rise car, in a manner to be described hereinafter. If the elevator car is advancing up in the low rise or if it is advancing down in the low rise but not committed to other than the lobby floor, negative results of tests 148b or 148d will cause the remainder of the program to be bypassed, and other programming reverted to through the return point 142. Eventually, the car, traveling down, reaches the point at which the lobby is the next committable floor, so an affirmative result of test 152 reaches a test 153 to determine if the stop control point has been reached, or not. This is the point at which, among other things, the lantern at the landing should be lit in order to inform passengers that the car is approaching. According to the invention of the parent, the last moment at which the decision can be made as to whether the car should be in the low rise or the high rise is the moment when the selected one of the lanterns (56, 57 in the parent) has to be lit. This is because of the precept of the parent invention: that the passengers will readily approach an elevator in the lobby service corridor for the floors that they intend to reach when a lantern lights (usually with a gong). Thus, if the car is going to be assigned in its next run to the low rise group, a lantern in the low rise lobby corridor 13 should be operated; then, the doors should open so as to permit entrance of passengers from the low rise lobby corridor 13. On the other hand, if car five is to be assigned to the high rise group in its next run, the lantern in the high rise lobby corridor 14 should be operated; then the doors should open to permit access by passengers which are in the high rise lobby corridor 14. Thus, reaching the stop control point for the lobby floor (affirmative result of both tests 152 and 153) is where normal swing car assignment takes place and the appropriate lantern is operated in the system of the aforementioned parent.

In a step 154 a new assignment flag for car five is set to indicate that no reassignment should occur until this flag is reset, as alluded to above and described more fully hereinafter. Then a test 155 examines the "next equals low" flag which was either set or reset the last time that the building low/high software module (FIG. 3) was run. If the flag is set, indicating that the next assignment of the swing car should be to the low group, then there will be an affirmative result of the test 155 which will reach a step 156 which will operate the car five low rise lobby lantern, in the low rise lobby corridor 13, thereby announcing to passengers that this is a car which can serve their needs in the low rise of the building. Then a test 157 determines if the high doors are enabled; this is just a convenient test for whether car five was operating in the high rise during the current run; other factors could be examined as well. If car five was in the high rise in the current run, then its present assignment to the low rise for the next run is a switch, so an affirmative result of test 157 will reach a step 160 which sets the "five switch to low" flag (that is tested in test 125 of FIG. 11 of the parent in the event that biasing is to be performed to adjust for switching from one rise to the other).

Then in a series of steps 161, all the attributes of the car relating to the high rise are reset. Specifically, the enablement of all of the lanterns for car five on high rise floors is reset, the enablement of the doors on the high rise side of the swing car 16 elevator shaft is reset, the portion of the car call panel having call buttons for high rise floors is no longer enabled, and car five is taken out of the high rise group, which can be achieved by setting to zero the car five bit in a map of available cars in the high group, as is described more fully with respect to FIGS. 5 and 6. Then, a series of steps 162a perform the converse functions to establish operation of car five in the low rise group. Specifically, enabling all of the lanterns for car five on the low rise floors, enabling the doors for operation at successive floors on the low rise side of the swing car 16 hoistway, enabling the car call panel for calls to the low rise floors. A test 162b determines if the elevators are running in an up peak mode. This embodiment of the invention does not allow swing cars to be assigned to hall calls during up peak, in order to return the cars to the lobby quickly to take passengers up from the longest lobby queue. Therefore, an affirmative result of test 162b reaches a step 162c to disable car five in the low rise group. If not in up peak, a negative result of test 162b reaches a step 162d, enabling car five in the low rise group. In another embodiment, test 162b is not used, car five is enabled in the assigned group even during up peak, and can therefore take calls from one group only. And then, other parts of the program are reverted to through the return point 142.

If, instead, the "next equals low" flag had been reset in FIG. 3, then a series of steps and tests 163–166d provides the same functions for the high rise and low rise as are provided for the low rise and high rise in the steps and tests 156–160, 162a–d and similar functions with respect to the low rise in steps 167 as are provided for the high rise in the steps 161.

In the event that one of the tests 144, 146 indicate that car five is relatively permanently assigned to the low rise group (such as to force an assignment during a convention, or the like), an affirmative result of one of these tests will pass through a step 186, described hereinafter, to reach tests 170, 171 to operate the low rise lobby lantern in step 172. Thereafter, the steps 161 and 162a–d are provided in the same fashion as when car five is operating as a swing car; when this is repetitively provided, it becomes redundant resetting and redundant setting, which is irrelevant.

In the event that either the elevator management system or a lobby dispatcher has relatively permanently assigned car five to the high rise group, then an affirmative result of either test 145 or 147 will pass through a step 187, described hereinafter, to reach tests and steps 173–175 which perform operation of the high rise lantern 57 in the same fashion as tests and steps 170–172 for the low rise lantern, and then perform steps 166a–d and 167.

As a car is assigned at the conclusion of a run, either to the same rise it was in or to the other rise, at the last moment, the step 154 will set the new assignment flag for car five. The test 143 at the top of FIG. 4 senses that fact and prevents any further basic assignment of the car until it leaves the lobby on a run in the assigned rise. During the period of time between when the lantern is lit in the lobby corridor of one rise or the other and when the doors close in anticipation of leaving the lobby level in an upward direction, no basic swing car assignment can be made because an affirmative result of test 143 prevents reaching the assignment process in the remainder of FIG. 4. Instead, a test 180 determines if the car is set for operation in the up direction or not. Initially it is not, so the remainder of the routine of FIG. 4 is bypassed to the return point 142. Eventually, the direction will be switched to the up direction so that in a subsequent pass through the routine of FIG. 4, an affirmative result of the test 180 will reach a test 181 to determine if the doors are closed. For a few passes, the result of test 181 will be negative and the remainder of FIG. 4 is bypassed to the return point 142. Eventually, the doors are closed as the upward run in the recent assignment begins. This reaches a set of steps 182 where the "five new assignment" flag of step 154 is reset and the fact that the elevator has recently been switched from one rise to the other is reset. This point is chosen to eliminate further biasing (should any be occurring) since the car is fully in service with respect to its new assignment. On the other hand, the resetting of these bias flags could be achieved at some other point, if desired, as is apparent in the aforementioned parent. Since the swing car has been assigned to one rise or the other based on traffic burden (rather than by the EMS or dispatcher), it may be useable in both groups in accordance with the invention. Therefore, a first test determines if the car is operating in a peak period. If not, it can be used in both groups for hall calls, so a negative result of test 183 reaches a step 184 that sets a "5 available to both flag". In up peak, cars may be prevented from working in either group; but in down peak, the groups send the cars to answer the calls. However, in peak traffic, the cars are prevented from joining either group as a "both" car by the test 183 which causes a step 184 to reset the "5 available to both" flag, to prevent hall call assignments in either opposite group, as described with respect to FIGS. 6 and 7. This ensures that swing cars will return to the lobby to serve the greater lobby burden in up peak, and will pick up only in one group during down peak. If desired, the down peak pick up may be limited to down calls in the assigned group. The steps 186 and 187 assure that dedicated swing cars are not assigned calls in the other group.

In the light of the foregoing teachings, it should be apparent that relatively straight-forward choices are to be made depending upon the rise in which the elevator is to be operated. Specifically, doors, panels, lanterns and group control have to be selected. Otherwise, operation of the elevator in the parent is the same as it normally would be, with or without all the fancy accouterments of any sort of dispatching to answer calls, up peak/down peak, zoning, channeling, and the like, as in the aforementioned patents. However, in accordance with the invention, special features are required as are described hereinafter.

Should the routine of FIG. 3 determine that merged operation has been enabled by the elevator management system, and that the time period currently is at night or during the weekend (however they may be defined in any utilization of the invention) then the merge flag will have been set in FIG. 3 so that, in FIG. 5, a negative result of test 251 reaching test 252 will in turn have an affirmative result which will reach a series of steps 257 which enables both the high and low lanterns, doors and car call panels, and enables car five in both the high group and the low group. This is what causes the swing car to operate in a merged rise as if both rises were a single rise. Then, the test 258 determines if car five has the lobby as its committable floor. If not, other parts of the program are reverted to through a return point 142a. But if the committable floor for the car is the lobby, then a test 259 determines if the car has reached the stop control point for the lobby, or not. If not, the routine reaches the return point 142a. But once the stop control point is reached, an affirmative result of test 259 reaches steps 260 which operate both the low lobby lantern and the high lobby lantern. This tells passengers that are in the low rise lobby corridor as well as passengers that are in the high rise lobby corridor that car five is approaching and will provide them with service to the floor of their intention, and they should approach the door of car five. Since the steps 257 have enabled the doors for both the high rise and the low rise, the ordinary operating mechanisms for car five will cause both the high doors and the low doors to open providing access from car five to both the low lobby corridor and the high lobby corridor once the car has reached the lobby floor. In this way, passengers will enter the car from both corridors and thereby be able to receive service to either the low rise or the high rise from car five. This is an important feature of the present invention. Once the steps 260 have been performed, other parts of the program are reverted to through the return point 135a.

If car five is not operating during a peak period mode, nor in a merge mode, negative results of tests 251 and 252 reach the test 253 to determine whether the elevator management system has set the car into the enhancement mode, which is another important feature of the present invention. In the enhancement mode, each swing car, as it approaches the lobby, is assigned to the low rise so that its lantern, doors and car call panels are enabled for the low rise, but it is assigned initially in both the high group and the low group thereby causing it to automatically proceed with passengers up through the low rise, servicing up calls in the low rise, but also being assigned, when deemed appropriate by the car call assigners described with respect to FIGS. 6 and 7 hereinafter, to hall calls in the high rise. Thus, the car having risen up through the low rise is not wasted; energy is saved by allowing this car to service up calls in the high rise which in turn reduces the high rise interfloor burden, thereby enabling cars servicing the high rise to return more frequently to the lobby. The net effect is that there is less need to cause cars to rise up through the express zone just for service in the high rise, and a great saving in energy and time and increased effectiveness in the system.

If an affirmative result of test 253 indicates that car five has been set into the enhancement mode, a test 263 determines if the car has a general upward direction or not. Initially it will have so an affirmative result of test 263 reaches a test 264 to determine if the car has reached the bottom floor of the high rise yet, or not. Initially, it will not as it is traveling up through the low rise, so a negative result of test 264 reaches the return point 135a. As the car crosses from the low rise into the high rise, an affirmative result of test 264 reaches a series of steps 265 in which the functions for the low rise (lanterns, door and panel) are reset, and the car is disabled from taking call assignments in the low group. Then, the functions (lanterns, door and panel) for the high rise are enabled, and the car is enabled to receive calls in the high group. As is described hereinafter, generally car five will have already been enabled in the high group, but in the event that the enhancement mode is turned on after a car leaves the lobby, this ensures that it becomes available for answering hall calls in the high group, as it enters the high rise. In subsequent passes, when the committable floor of the car is above the bottom floor of the high rise, the steps 265 are repeated redundantly, but harmlessly. Following the steps 265, the return point 142a is reached. Once the car finishes traveling upwardly in the high rise, when in the enhancement mode, it generally will reverse direction and travel downwardly, responding either to car calls or hall calls assigned to it by the high group. When that occurs, eventually, a negative result of test 263, indicating that the general direction of travel is downwardly, will reach a step 266 where the "five available to both" flag is set. This is done to allow the downwardly traveling car, even when it is still in the high rise, to accept down calls in the low rise, but only under certain circumstances, which are described with respect to FIG. 7, hereinafter. These circumstances amount to either that the low rise really needs help so that the car should not travel freely through the express zone back to the lobby, or that there are so few people in the car that it might as well utilize its downward trip to some advantage, thereby saving energy and eliminating some of the burden in the system so that the system will flow in an enhanced fashion. All of this is described with respect to FIG. 7, hereinafter. Then a test 269 determines if car five has the lobby as a committable floor. Initially it will not, so a negative result of test 269 reaches a test 270 which determines if the car has a committable floor at or below the top floor of the low rise, indicating it has entered the low rise. Initially it will not (in the general case it will still be in the high rise for a few passes through the routine of FIG. 5), so a negative result of test 270 causes the program to revert to other routines through the routine point 142a. Once the car enters the low rise, an affirmative result of test 270 reaches a step 271 which causes car five to no longer be available for hall call assignments in the high group. Then, a series of steps 272 resets the enablement of functions for the car in the high rise (lanterns, doors and car call panel). Thus, as the car travels downward through the low rise it will not be responsive to either group except through the mechanism of being available to both, as is described with respect to FIG. 7 hereinafter. Therefore, unless help is needed or the load is very light, the car will travel through the low rise as an express zone without stopping, in the usual fashion of a dedicated high rise car. When the car finally reaches the point where its committable floor is the lobby, an affirmative result of test 269 will reach a test 275 which determines if the car has reached its stop control point or not. If not, the return point 142a is reached, but once it has reached the stop control point, a series of steps 276 operate the low lobby lantern, to inform passengers that the car is approaching the low rise lobby corridor, and enable car five to respond to hall calls in both the low group and the high group, in accordance with this aspect of the invention. This means that as the car leaves the lobby floor, it can react to hall calls in the low rise and be assigned hall calls in the high rise as well, during its upward run through the building. Then the car five high functions (lanterns, door and panel) are disabled and the low rise function are enabled in the steps 272. Therefore, when the car actually reaches the lobby floor, the doors in the low rise corridor will open to enable passengers to enter the car. This happens every time the car approaches the lobby when in the enhancement mode. Thus, the car always leaves the low lobby, services the low rise and then passes into the high rise (unless there is no demand assigned to it in the high rise). As is described with respect to FIG. 9 hereinafter, should the car, when operating in the enhancement mode, become idle in the low rise or in the high rise, the only thing that happens is that it is made responsive to both the high group and the low group so that it can provide service where needed, without first returning to the lobby, in accordance with another aspect of the invention.

Whenever the car is to be dedicated to one rise or the other by the elevator management system or the lobby dispatcher, or whenever (such as in peak mode or in off-peak mode that is neither a merged mode or the enhancement mode), the car is assigned as it approaches the lobby to serve the rise with the greatest burden that is relevant to the operating mode, and therefore the car is controlled by the logic of FIG. 4. But in either the merge mode or the enhancement mode, the car is controlled by the logic of FIG. 5.

As referred to hereinbefore, a quasi-enhancement mode can be approximated by simply utilizing, in FIG. 2, a very high EMS low preference factor in step 99. This could be achieved without necessarily having the elevator management system capability of providing the enhancement mode as described with respect to FIG. 5. It would be a simpler embodiment, and could utilize high rise up call assignment logic of the various types described with respect to FIGS. 7–7b, or of the type described with respect to FIG. 10 hereinafter. In any case, a preferred embodiment of the invention will normally have every swing car that leaves the lobby proceed upwardly through the low rise and ultimately into the high rise, provided there is any demand in the high rise, as described hereinbefore.

Referring now to FIG. 6, the assignment of outstanding hall calls to elevator cars by the corresponding group controller may use the relative system response principles set forth in the aforementioned '381 patent. However, certain modification is required in order to handle the inter-group nature of the present invention. The exemplary routine of FIG. 6 is a modification of the routine shown in FIG. 7 of the aforementioned '381 patent. In FIG. 6, those steps and tests which have numerals within circles therein are steps and tests bearing those numerals as reference numbers in the aforementioned patent. The steps and tests not bearing numerals in circles are modifications in accordance with the present invention.

The high group assigner routine of FIG. 6 is reached through an entry point 22 and a pair of steps 23, 24 establish a car number and a car pointer to indicate the highest numbered car in the group (which in this case is the highest car in the building), and a step 25 resets an indication of the last car to have been assigned to a given call (P LAST) to zero. Then a test 26 determines if the routine of FIGS. 4 and 5 has previously enabled car P in the high group. If it has, car P is added to a map of high group cars by ANDing the bit map of cars in the high group with a bit map indicating car P, in a step 27. Then a test 28 determines if the car under consideration (car P) is amongst those in the map of cars available to satisfy demand in the high group. If the car is not available to the high group, most of the considerations with respect to this car are bypassed because a negative result of test 28 reaches a max/save transfer point 29, which just calls into play wrapping-up operations as are described with respect to FIG. 11 of the '381 patent. But if car P is available to satisfy demand in the high group, an affirmative result of test 28 reaches the routines 30 of steps 7–22 and the eligibility transfer point of step 23 of the aforementioned '381 patent, which in turn reaches the remainder of the assigner program shown in FIGS. 8–12 of the '381 patent. Thus, in the case where step 26 is affirmative because P is enabled in the high group in FIGS. 4 or 5 herein, operation is the same as in the '381 patent (or any other assignment routine which is chosen to implement the present invention).

If car P is not enabled in the high group, it may be a swing car that is nonetheless available in some fashion or another so a negative result of test 26 reaches a test 33 to determine if the "P available to both" flag has been set in FIGS. 4 and 5. This indicates that the car is a swing car which has been assigned to one rise or the other, but which may be used in either group under certain circumstances in accordance with the invention. If both tests 26 and 33 are negative, then the step 34 removes P from the high group. This is necessary since in the '381 patent, up calls and down calls are assigned in an alternative fashion, and the car might be available for down calls but not for up calls, as is described more fully with respect to FIG. 7 hereinafter. Therefore, the map of cars in the high group has car P removed from it in a step 34. Thereafter, the test 28 will cause the elimination of car P from consideration in answering up calls in the high group.

In FIG. 6, if the car is available to both groups, then a test 35 determines if car P has a general upward direction and if not, the car is eliminated in step 34. Any car assigned to the high group is handled by test 26; any car in the low rise group could take hall calls in the high group only if it were traveling upwardly, toward the high rise. If a car is traveling upwardly, then an affirmative result of test 35 reaches a test 36 to determine if up calls are being assigned in this pass: if not, car P is removed from cars available to answer calls in the high group in the step 34. But if the calls being assigned are up calls during the current pass through the assigner routine (rather than down calls), an affirmative result of test 36 reaches a test 37 to see if any down hall call in the low rise has been waiting for longer than the long wait threshold defined in steps 136 of FIG. 3. If so, the car is not allowed to be used in the high group, and an affirmative result of test 37 causes this car to be eliminated from the high group in step 34. But if there is no long waiting down call in the low rise, a negative result of test 37 causes this car to be added to the cars in the high group and therefore to be available in the high group in step and test 27 and 28, thereby to be considered for assignment of hall calls in the high group. An affirmative result of test 37 indicates that even though this is not a high group car by assignment, it is available to both, it is traveling up, the low rise down call traffic does not need help, and therefore this car can service up calls within the high rise. In such case, car P is added to the map of high group cars in the step 27. In an alternative embodiment of the invention, the use of the upwardly traveling low rise car in the high group is precluded if the general down hall call burden in the low rise is high, rather than testing to see if any one call has been waiting excessively long. FIG. 6a illustrates this embodiment, which is identical to FIG. 6 except the test 37a replaces test 37 of FIG. 6. Test 37a of FIG. 6a determines if down hall call waiting burden in the low rise is less than some threshold amount, indicating that it is permissible to use the precepts of the present invention to try to save car motion and time by allowing the up traveling car in the low rise to transfer to the high rise. In this embodiment of the invention, if there are a large number of passengers waiting for downward service in the low rise, even though none have waited too long yet, low rise cars will not be permitted to continue upwardly into the high rise, but will be instead confined to answering calls in the low rise, whereby downwardly traveling low rise passengers will be serviced. The low down wait burden need not be satisfied by swing cars 16 alone, since there are dedicated low rise cars 15 to answer low rise down calls. Therefore, the threshold need not equate to a single call, and could be quite high. The low down wait burden may be a prediction as in the aforementioned '497 patent, or some other measure of down call burden.

FIG. 6b illustrates that the characteristics of traffic level utilized to determine whether or not the controller will allow a swing car to operate under the control of a second group control may be combined. FIG. 6b is the same as FIG. 6 except that when there is a negative result of test 37, the routine of FIG. 6b will reach a test 37b to also ensure that the burden at the lobby is equal to or less than a threshold (which may be different than the threshold of FIG. 6a). In that way, if the swing car needs to service down calls in the low rise or return quickly to the lobby, it will not be allowed to join the high group as it travels upwardly to the low rise.

In FIG. 7, the low group assigner routine is identical to that described with respect to FIG. 6 for the high group of cars, with the exception of the fact that it all relates to down calls, the down direction and the low rise, and when the test 37 determines that there is a down call in the low rise which has been waiting for longer than the long wait threshold established in FIG. 3, the high rise car may take that call. This means that there is a system imbalance relating to a down call in the low rise, and, in this embodiment, it is deemed best to have the high rise car make a stop to alleviate that imbalance, even though the high rise passengers will have a slightly longer ride. Therefore, an affirmative result of test 37 will reach step 27a of FIG. 7 to have this car added to the cars in the low group. Of course, another test may be made to ensure that the downwardly traveling car is not full. Or, that fact can be accommodated in the usual fashion (such as at test 7 of FIG. 7 of the aforementioned 'Bittar patent where full cars are dealt with in the normal assignment process). Bear in mind that even though this car may be allowed to be considered in the low group, the down call may in fact be assigned to some other car, and this car may in turn be assigned to some other call in the low group. If there isn't a long waiting down call in the low group, a negative result of test 37 will reach a test 37c to determine whether the total traffic burden in the low group exceeds some threshold. If it does, an affirmative result of test 37c will reach the step 27a to have the car added to the low group. The point is, if the low group needs help in the down direction, then a swing car approaching the low group in the down direction may give it some help, when needed. But if the low group does not have a long waiting call nor an excessive overall burden, a negative result of test 37c will reach a test 37d to determine if the car in question is essentially empty. If there are only one or two passengers (or whatever is determined by the threshold of test 37b) in the downwardly traveling high rise car, that car may be caused to pick up passengers on the way down, simply to save energy, in accordance with another aspect of the present invention. In such a case, an affirmative result of test 37d reaches the step 27a to add the car to the low group.

Another embodiment of the invention, shown in FIG. 7a, is the same as the embodiment of FIG. 7 with the exception of the fact that a test 37e, used in place of the tests 37–37d, determines if the lobby burden is less than some threshold, which may be different than other thresholds herein. This threshold will usually be set extremely low so as to sense the case where traffic is extremely light, and a downward run from the high rise shouldn't be wasted. But if the lobby burden is high, a negative result of test 37c will cause the car to be eliminated in step 34 of FIG. 7; if the burden is extremely light, an affirmative result of test 37c will cause the car to be added to the low group in step 27a of FIG. 7. Another variation is to have yet another test as shown in FIG. 7b, such as a test 37f that allows a downwardly traveling high group car to be assigned to the low group only if the total high burden is then less than some threshold amount (LITE TRAF). This is so because the need to service the high rise, with the express zone, can be either because of traffic at the upper floors, or passengers queuing up at the lobby. If desired, this light traffic test could also be made dependent on the car not having many passengers. The remainder of the low rise call assignment processes are the same as described with respect to FIGS. 8–12 in the '381 patent.

All of the tests 37–37f are illustrative of the kinds of tests that may be used singly, or in combination. For instance, for downwardly traveling cars, an affirmative result of test 37f (FIG. 7b) could reach test 37e (FIG. 7a) so the downwardly traveling car might be assigned to calls in the low rise only if both the lobby burden and the high rise burden (or any combination of them) were extremely low. Similarly, an embodiment of the invention could allow the test 37 of FIG. 6 to be overridden by having an affirmative result thereof reach another test (rather than eliminating the car from the high group) to see if there is a high call wait burden in either direction in the high group. Or, comparison between high and low burdens may be made to determine if the upwardly traveling low rise car might be added to the high group. And all of these tests may be less than absolute: fuzzy logic may be used for individual tests or, more particularly, for combinations of tests to determine what an overall best result might be. Fuzzy logic of a suitable type is disclosed in U.S. Pat. No. 5,260,526. All of these combinations fall into the scheme of the invention which includes allowing a car in one group to be assigned in another group if that other group needs help, to save energy where possible, or unless the first group needs help, or combinations of these.

In all of these extra group assignments, the periodic reassignment of all the calls (as in the aforementioned '381 patent) can of course change things. That is, an up traveling car in the low rise might be assigned a hall call in the high rise, during one pass through the routine of FIG. 6, after which a down call in the low rise may become a long waiting call which would preclude the up traveling car from switching into the high rise. In the next pass through FIG. 6, the car will be eliminated from the next attempt to assign up calls in the high rise and therefore would lose the assignment made in the previous pass through FIG. 6. Thus, the invention is better served when practiced utilizing a call assignment routine which is repeated several times a second, or more.

FIGS. 6 and 7 illustrate one aspect of the present invention: that up traveling cars assigned to the low rise group may nonetheless accept hall calls in the high rise if low rise down hall call demand is very light; and that cars leaving the high rise may pick up passengers in the low rise if the high rise total traffic is very light.

Another aspect of the present invention is that one of the groups to which cars can be simultaneously assigned may be an interrise group that would permit passengers in the low rise to register hall calls known to be for travel to floors in the high rise, and vice versa. This is the subject matter of the aforementioned contemporaneous patent application. However, in the context of multi group control of swing cars, regardless of traffic demand, it is possible to permit any proper car to accept an interrise hall call, which is designated as such by being on a special riser (a special hall call button), that may be accessed only in response to some form of key, or not, as the case may be. In FIG. 8, an interrise group hall call assignment routine is reached through a transfer point 37 and a first test 38 determines whether there is an interrise hall call that has not yet been assigned. If not, other parts of the program are reverted to through a return point 39. If there is an interrise hall call which has not yet been responded to by a car, the routine will reach a step 40 in which the map of cars available to the group (in this case the interrise group) is set equal to the cars available to both groups (that is all of the swing cars which have set their "available to both" flags in FIGS. 4 or 5. And, the hall calls for the group are taken to be equal to all the hall calls requesting interrise service. Then, the hall call assignment routines 41 illustrated in FIGS. 6–12 of the aforementioned '381 patent, or any other suitable hall call assignment routine, may be provided. In case a car is assigned to a hall call, it may or may not answer that call since this routine can be performed repetitively until answered, as is described in the '381 patent. When there is a call assigned, it may be in the same rise as the group which is currently controlling the car, or not. For instance, if a car which is traveling upwardly and answering calls in the low rise group is in fact the quickest or best car to reach an interrise call in the high rise, it may be assigned to the call in the high rise while it is still being controlled by the low rise group. This is the multi-group aspect of the present invention. Similarly, a car being controlled by the high rise group may be assigned to an interrise call in the low rise when it appears that it is the best candidate to respond to that call. The determination of the best candidate may be in accordance with the relative system response methodology described in the '381 patent, or in accordance with some other suitable scheme. In the case of interrise traffic, the relative level of traffic in either rise is ignored so as to ensure that what appears to be a relatively good assignment can be made to any of the swing cars which are available to both groups. If desired, the assignment of cars available to the interrise group in steps 40 could be inclusive of all swing cars which are in service, even though those cars might be otherwise dedicated by the elevator management system or by the lobby dispatcher (as described in FIG. 4). These variations are irrelevant to the present invention.

Figure 9:
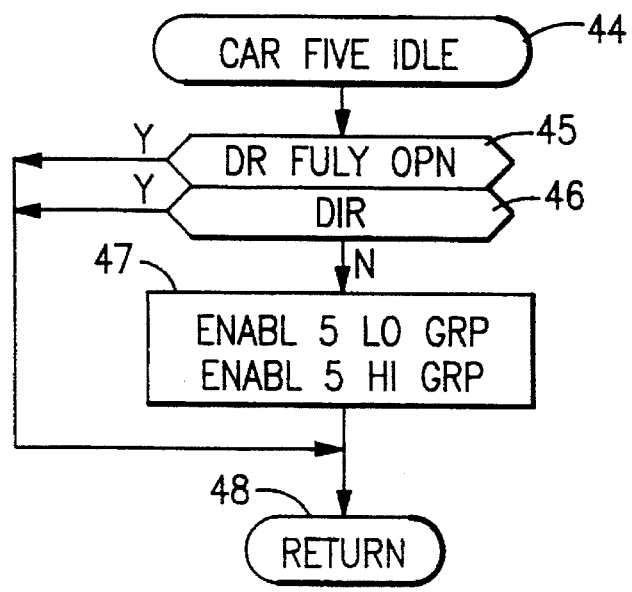
FIG. 9 is a logic flow diagram of an exemplary routine for assigning swing cars directly where needed whenever they are idle.

Referring now to FIG. 9, another aspect of the present invention can recognize when a swing car is idle (having no demand in either direction, with no hall calls or car calls to be serviced). The objective of this aspect of the invention is to avoid the necessity of returning a swing car to the lobby when in fact the demand may be at the non-lobby floors and the car might approach the greatest need directly. In FIG. 9, a car five idle routine is reached through a transfer point 44 and a first test 45 determines if the doors are fully open or not. When the doors are fully open, it cannot be known whether a passenger may yet enter the car and depress a car call button, thereby requiring service. If the doors are not fully open as indicated by a negative result of the test 45, a test 46 determines if the car has direction or not. As referred to hereinbefore, this means having a command for motion in the up or down direction. Doors being not fully open with no direction is indicative of an idle car having no demand. Therefore, a negative result of test 46 will reach a step 37 where car five is enabled in both the low group and the high group. And then other parts of the program are reverted to through a return point 48. This is another aspect of the present invention which causes an idle car to simply stay where it is, enabled in both groups, so that it can proceed directly to where it is needed most as soon as a call assignment is made. It should be noted that the call assignment might be to the lobby if there is a lobby call outstanding and the idle car is the best one to answer it. Or, it might be a hall call in either the low rise group of floors or the high rise group of floors.

Figure 10:
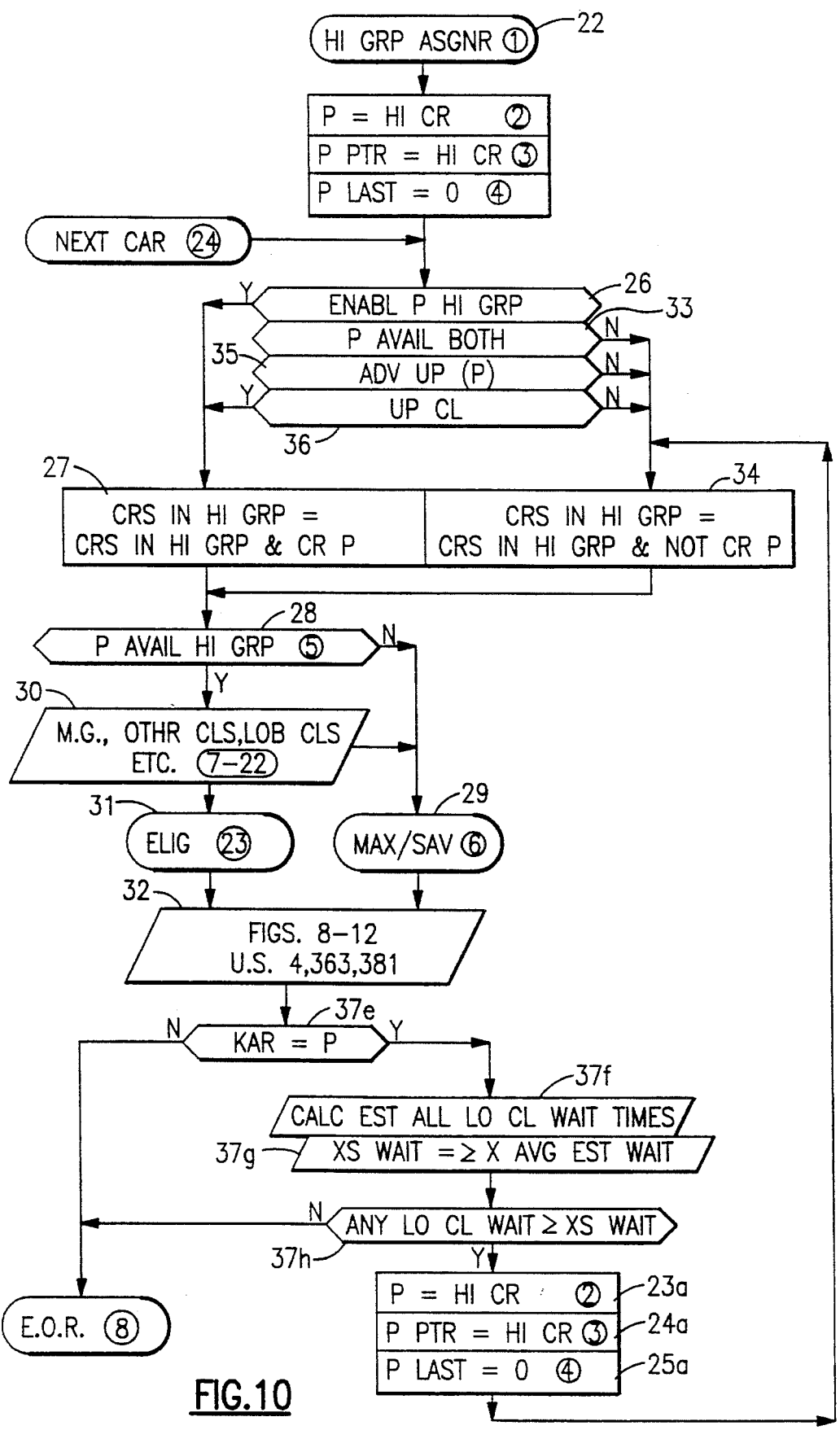
FIG. 10 is a logic flow diagram of an exemplary routine for assigning hall calls in the high group to cars, including swing cars which may be available to the high group, in a second embodiment.

An entirely different embodiment of the present invention is illustrated in FIG. 10, which is the same as FIG. 6 between steps and tests 22–32 and 33–36, except for the fact that test 37 of FIG. 6 is eliminated and any car available to both groups that is traveling up can be tentatively added to the group by an affirmative result of test 36 for the purpose of assigning up calls. An affirmative result of test 36 causes the car to be added to the high group in step 27. Then in steps and tests 28–32, the up call is assigned to one of the cars available to the high group, including cars enabled in the high group and cars available to both that are traveling up. When the call has been assigned, the car to which it has been assigned is established as "KAR" in the aforementioned '381 patent. Therefore, a test 37e determines whether car P had been assigned to this up call or not. If not, then the routine is exited through an end of routine point (E.O.R.; reference numeral 8 in FIG. 12 of the '381 patent). On the other hand, if this up call has been assigned to car P, then the effect on the low group will be determined. In a subroutine 37f, the estimated waiting time for all low rise hall calls are calculated, and twice the average of them is set to equal a threshold called "XS WAIT" in a subroutine 37g. Then a test 37h determines if any of the low calls estimated waiting time is greater than the threshold "XS WAIT". If not, this means that the assignment of that call to car P is acceptable and the routine is exited through the end of routine point. On the other hand, if any of the low calls have an excess waiting time, then it is assumed that more help is needed in the low rise so the low rise car which is available to both rises will not be utilized for that call in the high rise. An affirmative result of test 37h causes the steps 23, 24 and 25 to be repeated as steps 23a, 24a and 25a, to set the initial points for the assignment routine, and the program reverts to step 34 where car P is eliminated from the map of cars in the high group. Then the up call is assigned once again, this time without car P in the assignment process. Naturally, when the assignment is complete, test 37e will have a negative result so the routine will exit through the end of routine point. A nearly identical routine to that of FIG. 9 may be utilized for downwardly traveling calls of the high group with respect to the assignment of down calls in the low group, using any useful characteristic of the level of traffic as a test criterion (such as lobby call waiting, high rise hall call waiting, etc.). It should be borne in mind that the excess waiting which may result after assigning a call to a car may be because of that particular assignment, or it may not be because of that particular assignment. Therefore, the XW WAIT threshold may still be exceeded, but that is irrelevant. In either case, it is assumed that the car should concentrate its effort, for the time being, in the rise in which it is currently running whenever there is an affirmative result of test 37h.

A similar routine to FIG. 10 and FIG. 7 may be used for cars traveling downward in the low group. If desired, instead of the subroutines 37f, 37g and the test 37h, when traveling in the downward direction, similar subroutines and tests may be utilized with respect only to high rise lobby calls.

As alluded to hereinbefore, the specific routines disclosed herein are exemplary, and there is an endless array of criteria related to characteristics of the level of traffic, at various portions of a building and in various directions, and myriad combinations of tests which might be utilized to tailor the precepts of the present invention for preferred use in any given implementation thereof. Similarly, the invention may be used not only between any pair of adjacent rises (such as the third and fourth rise of an extremely tall building) but even between rises that aren't adjacent (such as between the second and fourth rise of a tall building). In fact, if the terms "low" and "high" are taken to be equivalent to "lower" and "higher", and if each of the routines is made available as between adjacent rises, swing cars can be made to step from one rise to an adjacent rise and then from that rise to yet a further rise utilizing the concepts disclosed herein. Therefore, the term "low rise" as used herein is deemed to include any rise that is lower with respect to a rise identified as a high rise, which is deemed to include any rise higher than a rise lower than it.

It should be borne in mind that the controller in a building in which the present invention is implemented may comprise a single controller (including the high, low and IR group controls) which in turn may comprise a single signal processor or distributed signal processors, or there may be distinct subcontrollers, one for the overall building functions of FIG. 2, one for the high group burden and call assignment of FIGS. 2 and 6, one for the low group burden and for the call assignment of FIG. 7, one for each car for the swing control of FIGS. 4 and 5 and the idle control of FIG. 9, and so forth. These routines need not be performed in any synchronized fashion, as is described more fully in the aforementioned parent application, but each will simply use whatever factors have been provided thereto by the others in the previous running of the others. These routines are repeated constantly, many times a second. The routines are performed while cars are actually in motion, and while cars are totally stopped allowing passengers ingress and egress, and while cars are idle or shut off. Therefore, as used herein, the term "traveling" does not necessarily imply motion, but includes stops for calls interspersed with motion as the car travels in response to an order to advance in one direction or the other. If desired, the invention can be used in a system that does not employ the burden determination of FIGS. 2 and 3 and/or the "NEXT=LO" flag of FIG. 4.

In all of the embodiments herein, the decision-making processes need not be crisp yes or no tests as illustrated, and the thresholds and other parameters need not be single valued; instead, the precepts of the present invention may be practiced utilizing fuzzy logic techniques, many of which are set forth in the aforementioned U.S. Pat. No. 5,260,526. As an example, the need for a car traveling upwardly in the low rise to remain in the low rise to assist in handling low rise traffic burden or lobby traffic burden (or both) can be expressed as a fuzzy number and it can be subtracted from (or have subtracted from it) a fuzzy number indicative of the need for the car to provide assistance to the high rise, so that a soft result reflecting both needs can be used to determine the manner in which the car should proceed. Similarly, a car traveling downwardly in the high rise can have a fuzzy number indicative of the number of passengers therein be subtracted from (or have subtracted from it) a fuzzy number indicative of the need for the low rise to have support in answering down hall calls, thereby to alleviate its burden, in order to determine whether the car should pass through the express zone without stops, or not, as it approaches the lobby. And these numbers can reflect historical and predictive values, as described hereinbefore. All of this is irrelevant to the present invention.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls;

said controller, in response to said next car assignment signal, disabling the hall call lanterns, doors, and car call buttons of said swing car for the other of said group of floors; and said controller determining if the committable floor of said swing car is a floor in said other group of floors contiguous to said selected group of floors and in response to said committable floor being said contiguous floor in said other group, enabling the hall lanterns, doors and car call buttons of said swing car for said other group of floors.

2. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls;

said controller, as said swing car completes an assigned run, disabling the hall call lanterns, doors, and car call buttons of said swing car for the other of said group of floors; and said controller determining if the committable floor of said swing car is a floor in said other group of floors contiguous to said selected group of floors and, in response to said committable floor being said contiguous floor in said other group, enabling the hall lanterns, doors and car call buttons of said swing car for said other group of floors and disabling the hall lanterns, doors and car call buttons of said swing car for said selected group of floors.

3. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said controller operating said lobby hall lantern and enabling said remaining hall lanterns, doors and car call buttons of said selected group of floors, enabling response of said swing car to hall calls in said selected group of floors assigned thereto by said corresponding group control, and disabling response of said car to hall calls in said other group of floors, and dispatching said swing car for service to said selected group of floors in response to said swing car assignment signal as said swing car completes an assigned run.

4. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising the absence of a hall call waiting in the selected group of floors for more than a long wait threshold period of time.

5. A system according to claim 4 further characterized by:

said characteristic of the traffic comprising the absence of a hall call, in said selected group of floors for service in a travel direction opposite to the direction in which said swing car is traveling, waiting for more than a long threshold period of time.

6. A system according to claim 4 further characterized by:

said controller providing a long wait signal indicative of a down hall call in the low rise group of floors waiting for a period of time in excess of a long time threshold period of time, said controller, when said swing car is traveling up in said system within said low rise group of floors and enabled for response to hall calls in said low rise group of floors assigned thereto by said low group control, enabling said swing car for response to hall calls in said high rise group of floors assigned thereto by said high group control in response to the absence of said long wait signal.

7. A system according to claim 6 further characterized by:

said controller enabling said swing car for response to up hall calls in said high rise group of floors in response to the absence of said long wait signal.

8. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising the presence of a hall call waiting in said other group of floors for more than a long wait threshold period of time.

9. A system according to claim 8 further characterized by:

said characteristic of the traffic comprising the presence of a hall call, in said other group of floors for service in a travel direction the same as the direction in which said swing car is traveling waiting for more than a long wait threshold of time.

10. A system according to claim 8 further characterized by:

said controller providing a long wait signal indicative of a down hall call in said low rise group of floors waiting for a period of time in excess of a long time threshold period of time, said controller, when said swing car is traveling down in said system within said high rise group of floors and enabled for response to hall calls in said high rise group of floors assigned thereto by said high group control, enabling said swing car for response to hall calls in said low rise group of floors assigned thereto by said low group control in response to the presence of said long wait signal.

11. A system according to claim 10 further characterized by:

said controller enabling said swing car for response to down hall calls in the low rise group of floors.

12. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising a hall call burden in the selected group of floors being less than a predetermined threshold burden.

13. A system according to claim 12 further characterized by:

said characteristic of the traffic comprising a hall call burden in said selected group of floors of hall calls for service in a travel direction opposite to the direction in which said swing car is traveling being less than said predetermined threshold burden.

14. A system according to claim 12 further characterized by:

said controller providing a burden signal indicative of a down hall call burden in said low rise group of floors in excess of a threshold burden, said controller, when said swing car is traveling up in said system within said low rise group of floors and enabled for response to hall calls in said low rise group of floors assigned thereto by said low group control, enabling said swing car for response to hall calls in said high rise group of floors assigned thereto by said high group control in response to the absence of said burden signal.

15. A system according to claim 14 further characterized by:

said controller enabling said swing car for response to up hall calls in said high rise group of floors.

16. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising a traffic burden in said selected group of floors being less than a predetermined threshold burden.

17. A system according to claim 16 further characterized by:

said controller providing a traffic burden signal indicative of a traffic burden in said high rise group of floors being less than a threshold traffic burden, said controller, when said swing car is traveling down in said system within said high rise group of floors and enabled for response to hall calls in said high rise group of floors assigned thereto by said high group control, enabling said swing car for response to hall calls in said low rise group of floors assigned thereto by said low group control in response to the presence of said traffic burden signal.

18. A system according to claim 17 further characterized by:

said controller enabling said swing car for response to down hall calls in said low rise group of floors.

19. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising a lobby burden being less than a threshold lobby burden.

20. A system according to claim 19 further characterized by:

said controller, when said swing car is traveling up in said system within said low rise group of floors and enabled for response to hall calls in said low rise group of floors assigned thereto by said low group control, enabling said swing car for response to hall calls in said high rise group of floors assigned thereto by said high group control in response to the presence of said traffic signal.

21. A system according to claim 20 further characterized by:

said controller enabling said swing car for response to up hall calls in said high rise group of floors.

22. A system according to claim 19 further characterized by:

said controller, when said swing car is traveling down in said system within said high rise group of floors and enabled for response to hall calls in said high rise group of floors assigned thereto by said high group control, enabling said swing car for response to hall calls in said low rise group of floors assigned thereto by said low group control in response to the presence of said traffic signal.

23. A system according to claim 22 further characterized by:

said controller enabling said swing car for response to down hall calls in said low rise group of floors.

24. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls; and said characteristic of the traffic comprising a period of very light traffic in said system.

25. A system according to claim 24 characterized by:

said controller, in response to said traffic signal indicating said period of very light traffic, enabling said swing car for response to hall calls in both directions in both said high rise group of floors and said low rise group of floors assigned thereto by said high group control and said low group control, respectively.

26. A system according to claim 24 further characterized by:

said period of very light traffic comprising a period of time during a weekend.

27. A system according to claim 24 further characterized by:

said period of very light traffic comprising a period of time during the nighttime.

28. A system according to claim 27 further characterized by:

said period of very light traffic comprising a period of time during a weekend.

29. A system according to claim 24 characterized by:

at least one of said elevators comprising a dedicated elevator disposed within a hoistway having access only to one of said groups of floors and having doors, hall lanterns and car call buttons for servicing only said one group of floors; and said controller shutting down said dedicated car during said period of very light traffic.

30. A system according to claim 29 characterized by:

at least one of said elevators comprising a dedicated elevator disposed within a hoistway having access only to said low rise group of floors and having doors, hall lanterns and car call buttons for servicing only said low rise group of floors;

at least one of said elevators comprising a dedicated car disposed within a hoistway having access only to said high rise group of floors, having doors, hall lanterns and car call buttons for servicing only said high rise group of floors; and said controller shutting down all of said dedicated cars during said period of very light traffic.

31. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and disabling response of said car to hall calls in the other of said groups of floors, and dispatching said swing car for service to said selected group of floors;

characterized by the improvement comprising:

said controller providing a traffic signal indicative of at least one characteristic of the traffic in said multi-elevator system, said controller, in response to said traffic signal indicating a particular characteristic of the level of traffic in said system, when said swing car is traveling in said system within said selected group of floors and enabled for response to hall calls in said selected group of floors assigned thereto by said corresponding group control, enabling said swing car for response to hall calls in the other one of said groups of floors assigned thereto by the other one of said group controls;

said controller providing said traffic signal indicative of a period of very light traffic in said system; and said controller, in response to said swing car assignment signal, disabling the hall call lanterns, doors, and car call buttons of said swing car for the other of said group of floors except in the presence of said light traffic signal.

32. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and dispatching said swing car for service to said selected group of floors;

characterized by the improvement comprising:

at least one of said elevators comprising a dedicated elevator car disposed within a hoistway having access only to one of said groups of floors and having doors, hall lanterns and car call buttons for servicing only said one group of floors; and said controller providing a traffic signal indicative of at least one characteristic of the level of traffic in said multi-elevator system, said controller, in response to said traffic signal indicating a particular characteristic of the level of traffic in said system, shutting down said dedicated elevator car.

33. A system according to claim 32 further characterized by:

said characteristic of the level of traffic comprising a period of very light traffic in said system.

34. A system according to claim 33 further characterized by:

said period of very light traffic comprising a period of time during a weekend.

35. A system according to claim 33 further characterized by:

said period of very light traffic comprising a period of time during the nighttime.

36. A system according to claim 35 further characterized by:

said period of very light traffic also comprising a period of time during a weekend.

37. A system according to claim 33 further characterized by:

said controller, in response to said traffic signal indicating said period of very light traffic, enabling said swing car for response to hall calls in both directions in both said high group and said low group.

38. A system according to claim 32 further characterized by:

at least one of said elevators comprising a dedicated elevator disposed within a hoistway having access only to said low rise group of floors and having doors, hall lanterns and car call buttons for servicing only said low rise group of floors;

at least one of said elevators comprising a dedicated car disposed within a hoistway having access only to said high rise group of floors, having doors, hall lanterns and car call buttons for servicing only said high rise group of floors; and said controller shutting down all of said dedicated cars during said period of very light traffic.

39. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, and dispatching said swing car for service to said selected group of floors;

characterized by the improvement comprising:

said controller providing a peak signal indicative of a peak traffic period; and said controller, in the absence of said peak signal, enabling response of said swing car to hall calls in said selected group of floors assigned thereto by the corresponding group control identified by said swing car assignment signal, said controller, in the presence of said peak signal, preventing response of said swing car to hall calls in either of said groups of floors.

40. A system according to claim 39 further characterized by:

said controller providing said peak signal in response to an up peak traffic period.

41. A system according to claim 39 further characterized by:

said controller providing said peak signal in response to a down peak traffic period.

42. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and dispatching said swing car for service to said selected group of floors;

characterized by the improvement comprising:

said controller determining when said swing car has no demand and in response thereto enabling response of said swing car to hall calls in either of said groups of floors.

43. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of a selected group of floors to which the next swing car assignment should be made and in response thereto operating the lobby hall lantern and enabling the remaining hall lanterns, doors and car call buttons of said selected group of floors, enabling response of said swing car to hall calls in said selected group of floors assigned thereto by the corresponding group control identified by said swing car assignment signal, and dispatching said swing car for service to said selected group of floors;

characterized by the improvement comprising:

said controller providing a traffic signal indicative of at least one characteristic of the traffic in said multi-elevator system, said controller, in response to said traffic signal, enabling said swing car to travel into the other one of said groups of floors to service a call, said controller, in response to the committable floor of said swing car being a floor in said other group of floors, enabling the hall lanterns, doors and car call buttons of said swing car for servicing said other group of floors.

44. A system according to claim 43 further characterized by:

said controller, in response to the committable floor of said swing car being a floor in said other group of floors disabling the hall lanterns, doors and car call buttons of said selected group of floors.

45. A system according to claim 43 further characterized by:

said controller, in response to said traffic signal indicating a particular characteristic of the level of traffic in said system, when said swing car is traveling in said system within said selected group of floors, enabling said swing car for response to hall calls in the other one of said groups of floors assigned thereto by the corresponding group control.

46. A system according to claim 43 further characterized by:

said controller, in response to said traffic signal, enabling passengers in said swing car, as said swing car is traveling in said system within said selected group of floors, to register a car call for service to a floor in said other group of floors.

47. A system according to claim 43 further characterized by:

said controller enabling said swing car to travel from said other group of floors into said selected group of floors, said controller, in response to the committable floor of said swing car being a floor in said selected group of floors, enabling the hall lanterns, doors and car call buttons of said swing car for servicing said selected group of floors.

48. A system according to claim 47 further characterized by:

said controller enabling said swing car to travel from said other group of floors into said selected group of floors, and thereafter, in response to the committable floor of said swing car being a floor in said selected group of floors, disabling the hall lanterns, doors and car call buttons of said other group of floors.

49. A system according to claim 47 further characterized by:

said selected group of floors is said low rise group and said floor in the other group of floors is the bottom floor in said high rise group of floors.

50. A system according to claim 43 further characterized by:

said selected group of floors is said low rise group and said floor in the other group of floors is the bottom floor in said high rise group of floors.

51. A system according to claim 43 further characterized by:

said selected group of floors is said high rise group of floors and said floor in the other group of floors is the top floor in said low rise group of floors.

52. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors; and at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors;

characterized by the improvement comprising:

a controller operable each time that said swing car approaches the lobby floor operating the lobby hall lantern of said low rise group of floors and enabling the remaining hall lanterns, doors and car call buttons of said low rise group of floors, and enabling response of said swing car to hall calls in said low rise group of floors assigned thereto by said low group control, and to hall calls in said high rise group of floors assigned thereto by said high group control, and dispatching said swing car for service in both of said groups of floors.

53. A system according to claim 52 further characterized by:

said controller, in response to said swing car having a committable floor which is equal to or higher than the bottom floor in said high rise group of floors, disabling the hall lanterns, doors and car call buttons of said low rise group of floors.

54. A system according to claim 52 further characterized by:

said controller providing a traffic signal indicative of at least one characteristic of the traffic in said multi-elevator system, said controller, in response to said traffic signal indicating a particular characteristic of the traffic in said system, when said swing car is traveling downward in said system within one of said groups of floors enabling said swing car for response to hall calls in the other one of said groups of floors assigned thereto by the other one of said group controls.

55. A system according to claim 52 further characterized by:

said controller providing a long wait signal indicative of a down hall call in said low rise group of floors waiting for a period of time in excess of a long time threshold period of time, said controller, when said swing car is traveling down in said system within said high rise group of floors, enabling said swing car for response to hall calls in said low rise group of floors assigned thereto by said low group control in response to the presence of said long wait signal.

56. A system according to claim 55 further characterized by:

said controller enabling said swing car for response to down hall calls in the low rise group of floors.

57. A system according to claim 52 further characterized by:

said controller providing a burden signal indicative of a down hall call burden in said low rise group of floors in excess of a threshold burden, said controller, when said swing car is traveling down in said system within said high rise group of floors, enabling said swing car for response to hall calls in said low rise group of floors assigned thereto by said low group control in response to the presence of said burden signal.

58. A system according to claim 57 further characterized by:

said controller enabling said swing car for response to down hall calls in said low rise group of floors.

59. A system according to claim 52 further characterized by:

said swing car providing a load signal indicative of the fact that said swing car is nearly empty, said controller when said swing car is traveling down in said system within said high rise group of floors, enabling said swing car for response to hall calls in said low rise group of floors assigned thereto by said low group control in response to the presence of said load signal.

60. A system according to claim 59 further characterized by:

said controller enabling said swing car for response to down hall calls in said low rise group of floors.

61. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors; and at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors;

characterized by the improvement comprising:

a controller for periodically assigning said swing car to provide service in one of said groups of floors, said controller, when said swing car is traveling in one of said groups of floors toward the other of said groups of floors enabling said swing car to respond to hall calls assigned thereto in the other of said groups of floors whenever such enablement will not unduly disrupt the flow of traffic in said elevator system.

62. A multi-elevator system, comprising:

a plurality of elevators arranged to service at least a low rise group of floors and a high rise group of floors, responding to up hall calls and down hall calls assigned thereto, respectively, by a low group control and a high group control, all of said elevators having service corridors on the same lobby floor for access to the relevant floors;

at least one of said elevators comprising a swing car disposed within a hoistway having access to both of said groups of floors, having first doors, hall lanterns and car call buttons for servicing said low rise group of floors and having second doors, hall lanterns and car call buttons for servicing said high rise group of floors; and a controller for providing a swing car assignment signal indicative of the selected group of floors to which the next swing car assignment should be made and in response thereto operating the lobby hall lantern and enabling the remaining hall lanterns, doors and car call buttons of the selected group of floors, enabling response of said swing car to hall calls in said selected group of floors assigned thereto by the corresponding group control identified by said swing car assignment signal, and dispatching said swing car for service to said selected group of floors;

characterized by the improvement comprising:

said controller providing a special traffic signal indicative of at least one characteristic of the traffic in said multi-elevator system;

said system comprising a third group control for assigning hall calls in said system; and said controller enabling response of said swing car to hall calls assigned thereto by said third group control in response to said special traffic signal.

* * * * *